(12) United States Patent
Zhou et al.

(10) Patent No.: US 12,282,234 B2
(45) Date of Patent: Apr. 22, 2025

(54) DISPLAY DEVICE

(71) Applicant: BOE Technology Group Co., Ltd., Beijing (CN)

(72) Inventors: Chunmiao Zhou, Beijing (CN); Kuanjun Peng, Beijing (CN); Tao Hong, Beijing (CN); Xin Gu, Beijing (CN); Kang Guo, Beijing (CN); Xue Dong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 679 days.

(21) Appl. No.: 17/434,670

(22) PCT Filed: Nov. 9, 2020

(86) PCT No.: PCT/CN2020/127471
§ 371 (c)(1),
(2) Date: Aug. 27, 2021

(87) PCT Pub. No.: WO2022/095017
PCT Pub. Date: May 12, 2022

(65) Prior Publication Data
US 2022/0350207 A1    Nov. 3, 2022

(51) Int. Cl.
*G02F 1/1335* (2006.01)
*G02F 1/1343* (2006.01)
*H04N 13/383* (2018.01)

(52) U.S. Cl.
CPC .. *G02F 1/134336* (2013.01); *G02F 1/133526* (2013.01); *H04N 13/383* (2018.05)

(58) Field of Classification Search
None
See application file for complete search history.

(56) References Cited

U.S. PATENT DOCUMENTS

| | | | |
|---|---|---|---|
| 9,521,402 B2 | 12/2016 | Liao | |
| 10,045,013 B2 | 8/2018 | Zhao et al. | |
| 10,230,942 B2 | 3/2019 | Yang et al. | |
| 10,670,871 B2 * | 6/2020 | Wu | G02B 30/29 |

(Continued)

FOREIGN PATENT DOCUMENTS

| | | |
|---|---|---|
| CN | 104267525 A | 1/2015 |
| CN | 104597609 A | 5/2015 |

(Continued)

*Primary Examiner* — Thanh Nhan P Nguyen
(74) *Attorney, Agent, or Firm* — Banner & Witcoff, Ltd.

(57) ABSTRACT

A display device is provided. The display device includes: a plurality of sub-pixels and a light splitting structure including a plurality of light splitting portions. Each of the plurality of sub-pixels includes a plurality of display units, the plurality of sub-pixels are arranged as a plurality of sub-pixel row groups, each of the plurality of sub-pixel row groups includes at least two rows of sub-pixels, a gap is provided between two adjacent sub-pixels in each row of sub-pixels, and two adjacent rows of sub-pixels in each sub pixel row groups are shifted from each other in a row direction so that a sub-pixel in one row and the gap between two adjacent sub-pixels in another row are shifted from each other; a ratio of a size of each light splitting portions along the row direction to a pitch of the sub-pixels is in a range from 0.9 to 1.1.

10 Claims, 8 Drawing Sheets

(56) References Cited

U.S. PATENT DOCUMENTS

2005/0083246 A1* 4/2005 Saishu .................. G02B 30/30
　　　　　　　　　　　　　　　　　　　348/E13.043
2006/0244761 A1　11/2006 Berestov et al.
2010/0259697 A1* 10/2010 Sakamoto ............ H04N 13/359
　　　　　　　　　　　　　　　　　　　359/463

FOREIGN PATENT DOCUMENTS

| CN | 104614863 A | 5/2015 |
| CN | 105572886 A | 5/2016 |
| CN | 107942525 A | 4/2018 |

* cited by examiner

DISPLAY DEVICE

The application is a U.S. National Phase Entry of International Application No. PCT/CN2020/127471 filed on Nov. 9, 2020, designating the United States of America. The present application claims priority to and the benefit of the above-identified application and the above-identified application is incorporated by reference herein in its entirety.

TECHNICAL FIELD

At least one embodiment of the present disclosure relates to a display device.

BACKGROUND 3D display refers to a display mode in which various technical means, such as optics and the like, are used to simulate and realize the stereoscopic visual characteristics of human eyes, and spatial objects are reproduced as 3D information to present a stereoscopic image with a sense of depth. At present, a naked-eye 3D display device includes a display panel and a light splitting structure attached to the display panel.

SUMMARY

At least one embodiment of the present disclosure provides a display device, including: a base substrate; a plurality of sub-pixels, located on the base substrate; a light splitting structure, configured to split image light emitted from the plurality of sub-pixels to different viewpoint regions, the light splitting structure including a plurality of light splitting portions arranged along a row direction and extending along a column direction. Each of the plurality of sub-pixels includes a plurality of display units arranged along the row direction, the plurality of sub-pixels are arranged as a plurality of sub-pixel row groups, the plurality of sub-pixel row groups extend along the row direction and are arranged along the column direction, each of the plurality of sub-pixel row groups includes at least two rows of sub-pixels, a gap is provided between two adjacent sub-pixels in each row of sub-pixels, and two adjacent rows of sub-pixels in each of the plurality of sub-pixel row groups are shifted from each other in the row direction so that a sub-pixel in one row of sub-pixels and the gap between two adjacent sub-pixels in another row of sub-pixels are overlapped in the column direction; a ratio of a size of each of the plurality of light splitting portions along the row direction to a pitch of the plurality of sub-pixels is in a range from 0.9 to 1.1.

For example, in an embodiment of the present disclosure, each of the plurality of sub-pixel row groups includes a plurality of first color sub-pixels, a plurality of second color sub-pixels and a plurality of third color sub-pixels, and a plurality of viewpoint regions formed after image light emitted from each of the plurality of sub-pixel row groups passing through the light splitting structure are continuously arranged along the row direction.

For example, in an embodiment of the present disclosure, for sub-pixels with a same color corresponding to a same light splitting portion and located in a same sub-pixel row group, one gap located in the same row as and adjacent to a sub-pixel is overlapped in the column direction with a sub-pixel with the same color from a different row.

For example, in an embodiment of the present disclosure, the light splitting structure includes a plurality of light splitting portion column groups, each of the plurality of light splitting portion column groups includes at least two light splitting portions, and sub-pixels with a same color corresponding to a same light splitting portion column group and located in a same sub-pixel row group respectively correspond to different regions in different light splitting portions, and for sub-pixels corresponding to a same light splitting portion column group and located in a same sub-pixel row group, one gap, which is located in the same row as and adjacent to each color sub-pixel corresponding to one light splitting portion, corresponds to a region relative to the one light splitting portion, the same region relative to another light splitting portion is overlapped in the column direction with a sub-pixel with the same color as the each color sub-pixel and corresponding to the another light splitting portion.

For example, in an embodiment of the present disclosure, sub-pixels arranged along the row direction are sub-pixels with a same color, and a first color sub-pixel row, a second color sub-pixel row and a third color sub-pixel row are arranged sequentially and repeatedly along the column direction, and each of the plurality of sub-pixel row groups includes 3N rows of sub-pixels, where N is a positive integer.

For example, in an embodiment of the present disclosure, in each of the plurality of sub-pixel row groups, one gap located in the same row as and adjacent to each color sub-pixel is overlapped, in the column direction, with a sub-pixel located in a different row and of a color different from that of the each color sub-pixel.

For example, in an embodiment of the present disclosure, the plurality of first color sub-pixels, the plurality of second color sub-pixels and the plurality of third color sub-pixels are arranged sequentially and repeatedly along the row direction, sub-pixels located in different rows and with a same color are overlapped in the column direction, sub-pixels located in different rows and of different colors are not overlapped in the column direction, in two adjacent rows of sub-pixels which are respectively located in adjacent sub-pixel row groups, a right edge of one row of sub-pixels is aligned with a left edge of the other row of sub-pixels of a color different from that of the one row of sub-pixels, and each of the plurality of sub-pixels includes the left edge and the right edge which are opposite to each other in the row direction and extend in the column direction.

For example, in an embodiment of the present disclosure, each of the plurality of sub-pixel row groups includes M rows of sub-pixels, and a shifted direction of a (m+1)-th row of sub-pixels relative to an m-th row of sub-pixels is the same as a shifted direction of a (m+2)-th row of sub-pixels relative to the (m+1)-th row of sub-pixels, where M≥3, M≥(m+2), and m is a positive integer.

For example, in an embodiment of the present disclosure, the plurality of first color sub-pixels, the plurality of second color sub-pixels and the plurality of third color sub-pixels are arranged sequentially and repeatedly along the row direction, and in each of the plurality of sub-pixel row groups, one gap located in the same row as and adjacent to each color sub-pixel is overlapped, in the column direction, with a sub-pixel located in a different row and of a color different from that of the sub-pixel adjacent to the gap.

For example, in an embodiment of the present disclosure, adjacent display units are closely arranged in each of the plurality of sub-pixels.

For example, in an embodiment of the present disclosure, each of the plurality of light splitting portions includes a lenticular lens.

For example, in an embodiment of the present disclosure, the display device further includes: an eye tracker and an image adjusting portion, the eye tracker being connected with the image adjusting portion, the image adjusting portion being connected with a display panel, and the display panel including the base substrate and the plurality of sub-pixels. The eye tracker is configured to track a position of an eye and transmit information of the position to the image adjusting portion, and the image adjusting portion is configured to control corresponding viewpoint image information displayed by the plurality of sub-pixels according to the information.

Another embodiment of the present disclosure provides a display device, including: a base substrate; a plurality of sub-pixels, located on the base substrate; a light splitting structure, configured to split image light emitted from the plurality of sub-pixels to different viewpoint regions, the light splitting structure including a plurality of light splitting portion groups arranged along a row direction and extending along a column direction, an orthographic projection of each of the plurality of light splitting portion groups on the base substrate is overlapped with an orthographic projection of one column of sub-pixels on the base substrate. Each of the plurality of sub-pixels includes a display units arranged along the row direction, and each of the plurality of light splitting portion groups includes b light splitting portions arranged along the row direction and extending along the column direction, where a and b are positive integers, a ratio of a to b is non-integer, and b>2.

For example, in an embodiment of the present disclosure, an interval is provided between two adjacent display units in each of the plurality of sub-pixels, and along the row direction, a ratio of a size of each display unit to a size of each interval is c, where c=b−1.

For example, in an embodiment of the present disclosure, adjacent display units are closely arranged in each of the plurality of sub-pixels.

For example, in an embodiment of the present disclosure, each of the light splitting portions includes a lenticular lens.

For example, in an embodiment of the present disclosure, the display device further includes: an opposing substrate, located at one side of the plurality of sub-pixels away from the base substrate and arranged opposite to the base substrate. The light splitting structure is formed by patterning on one side of the opposing substrate facing the base substrate or on one side of the opposing substrate away from the base substrate.

For example, in an embodiment of the present disclosure, each of the light splitting portions includes a lenticular lens, and a light shielding structure is provided between adjacent lenticular lenses.

For example, in an embodiment of the present disclosure, the lenticular lens includes a planar side and a convex side, and the light splitting structure further includes a filling portion at the convex side of the lenticular lens, the filling portion is in contact with the convex side and a surface of the filling portion away from the lenticular lens is a planar surface, and a refractive index of the lenticular lens is greater than a refractive index of the filling portion.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
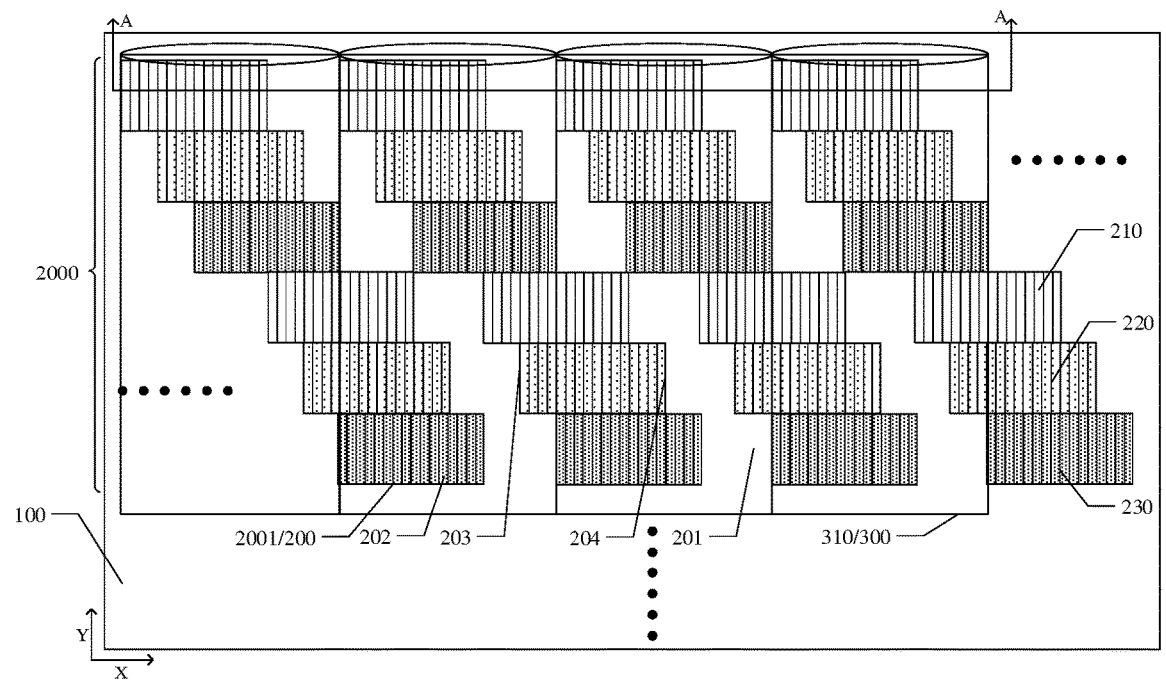
FIG. 1 is a plan structural view of a partial structure of a display device according to an example of an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

The embodiments of the present disclosure provide a display device. The display device includes: a base substrate, a plurality of sub-pixels located on the base substrate and a light splitting structure. The light splitting structure is configured to split image light emitted from the plurality of sub-pixels to different viewpoint regions, and the light splitting structure includes a plurality of light splitting portions arranged along a row direction and extending along a column direction. Each of the plurality of sub-pixels includes a plurality of display units arranged along the row direction, the plurality of sub-pixels are arranged as a plurality of sub-pixel row groups, the plurality of sub-pixel row groups extend along the row direction and are arranged along the column direction, each of the plurality of sub-pixel row groups includes at least two rows of sub-pixels, a gap is provided between two adjacent sub-pixels in each row of sub-pixels, and two adjacent rows of sub-pixels in each of the plurality of sub-pixel row groups are shifted from each other in the row direction, so that sub-pixels in one row of sub-pixels and the gap between two adjacent sub-pixels in another row of sub-pixels are overlapped in the column direction; a ratio of the size of each of the plurality of light splitting portions along the row direction to a pitch of the plurality of sub-pixels is in a range from 0.9 to 1.1. In the embodiments of the present disclosure, by adjusting the positional relationship between gaps and sub-pixels which are in different rows, and the size relationship between the pitch of the sub-pixels and the light splitting portions, the brightness compensation at the gaps between the sub-pixels with discontinuous illumination can be realized, thereby eliminating the moire caused by the discontinuous illumination of the sub-pixels.

Hereinafter, the display device provided by the embodiments of the present disclosure will be described with reference to the accompanying drawings.

Figure 2:
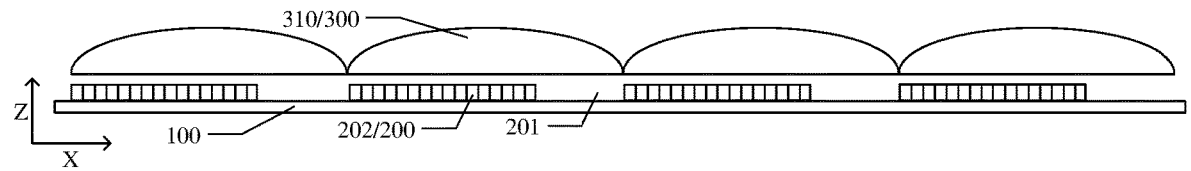
FIG. 2 is a cross-sectional view of a partial structure taken along line AA as shown in FIG. 1.

FIG. 1 is a plan structural view of a partial structure of a display device according to an example of an embodiment of the present disclosure, and FIG. 2 is a cross-sectional view of a partial structure taken along line AA as shown in FIG. 1. As shown in FIG. 1 and FIG. 2, the display device includes a base substrate 100, a plurality of sub-pixels 200 located on the base substrate 100, and a light splitting structure 300. Each sub-pixel 200 includes a plurality of display units 202 arranged in the row direction. The plurality of sub-pixels 200 are arranged as a plurality of sub-pixel row groups 2000, and the plurality of sub-pixel row groups 2000 extend along the row direction and are arranged along the column direction. Each sub-pixel row group 2000 includes at least two rows of sub-pixels 200, a gap 201 is provided between two adjacent sub-pixels 200 in each row of sub-pixels 2000, and in each sub-pixel row group 2000, two adjacent rows of sub-pixels 200 are shifted from each other in the row direction, so that sub-pixels 200 in one row of sub-pixels 200 and the gap 201 between two adjacent sub-pixels 200 in another row of sub-pixels 200 are overlapped in the column direction. The light splitting structure 300 is configured to split image light emitted from the plurality of sub-pixels 200 to different viewpoint regions, and the light splitting structure 300 includes a plurality of light splitting portions 310 arranged along the row direction and extending along the column direction, and a ratio of a size of each light splitting portion 310 along the row direction to a pitch of the sub-pixels 200 is in a range from 0.9 to 1.1. In the embodiment of the present disclosure, by adjusting the positional relationship between gaps and sub-pixels which are in different rows from the gaps in each sub-pixel row group and the size relationship between the pitch of the sub-pixels and the light splitting portions, the brightness compensation at the gaps between the sub-pixels with discontinuous illumination can be realized, thereby eliminating the moire caused by the discontinuous illumination of the sub-pixels.

In the embodiment of the present disclosure, the gap between adjacent sub-pixels 200 described above refers to a gap between light emitting regions 2001 of adjacent sub-pixels, and the gap between the light emitting regions is easily to cause the moire with the function of the light splitting device, thus affecting the display effect of the display device. For example, in the case where the display device is an organic light emitting diode display device, the display device further includes a pixel defining layer, each sub-pixel includes a first electrode, a light emitting layer and a second electrode, and the light emitting region is a region where the light emitting layer is in contact with both of the first electrode, and the second electrode, and this region is the effective part of the light emitting layer that can emit light. For example, the light emitting region is a region defined by an opening of the pixel defining layer. For example, in the case where the display device is a liquid crystal display device, the display device includes an array substrate and a color filter substrate, and the light emitting region can be an opening region defined by a black matrix in the color filter substrate.

For example, in the case where the display device is a liquid crystal display device, a data line is arranged between adjacent sub-pixels, and the data line is shielded by the black matrix at a corresponding position of the color filter substrate, thereby forming a non-luminous black region gap between the sub-pixels. For example, in the case where the display device is an organic light emitting diode display device, there will be a gap between the electrodes which are formed by patterning, thus forming a gap between the light emitting regions of the sub-pixels.

For example, the size of each light splitting portion 310 along the row direction is the same as the pitch of the sub-pixels 200. The pitch of the sub-pixels 200 can refer to the distance between the centers of two adjacent sub-pixels 200 arranged along the row direction, and the distance is basically equal to the sum of the size of the sub-pixel 200 along the row direction and the size of the gap 201 along the row direction.

For example, the plurality of display units 202 included in each sub-pixel 200 can be independent display units 202, and the plurality of display units 202 included in each sub-pixel 200 can be independently controlled; and different gray-scale pictures can be input to sub-pixels with the same color, and during 3D display, super multi-viewpoint naked-eye 3D display can be realized through multi-gray-scale drive rendering. For example, FIG. 1 and FIG. 2 illustratively take that each sub-pixel 200 includes sixteen display units 202 as an example, but are not limited thereto; and the number of display units needs to be determined according to the resolution required by the display device.

The display device provided by the embodiment of the present disclosure is a 3D display device. The plurality of display units included in each sub-pixel can respectively display images corresponding to the left and right eyes of a human, so that the multi-viewpoint image information displayed by each sub-pixel can form a naked-eye 3D image after passing through a corresponding light splitting portion.

Sub-pixels in the embodiments of the present disclosure can refer to red sub-pixels (R), green sub-pixels (G) and blue sub-pixels (B) in the display device (e.g., an organic light emitting diode display device or a liquid crystal display device, etc.), and display units in each sub-pixel are independent display units formed by dividing the sub-pixel in the display device to realize the subdivision of the sub-pixel.

For example, as shown in FIG. 1 and FIG. 2, in each sub-pixel 200, adjacent display units 202 are closely arranged. For example, adjacent display units 202 being closely arranged means that the interval between adjacent display units 202 in each sub-pixel 200 is very small, and no black region will be presented after image light passes through the light splitting structure. Here, the "interval" in the sentence "the interval between adjacent display units 202 in each sub-pixel 200 is very small" refers to an interval between the light emitting regions of adjacent display units, and the interval cause image light to easily form the moire after passing through the light splitting structure, thus affecting the display effect of the display device.

For example, the embodiment of the present disclosure illustratively shows that the X direction is the row direction and the Y direction is the column direction, but the embodiment of the present disclosure is not limited thereto, and the row direction and the column direction can be interchanged. For example, the embodiment of the present disclosure illustratively shows that the row direction is perpendicular to the column direction, but is not limited thereto.

For example, the arrangement direction of the light splitting portions 310 is the same as the arrangement direction of the plurality of display units 202 in each sub-pixel 200, the arrangement direction can be called either the row direction or the column direction, and the embodiment of the present disclosure is described by taking that the arrangement direction of the light splitting portions is the row direction as an example. For example, the arrangement direction of the light splitting portions is parallel to the direction of the connecting line between the two eyeballs when human eyes watches the display device.

For example, FIG. 2 illustratively shows that the light splitting structure 300 is located at one side of the sub-pixels 200 away from the base substrate 100, which is not limited thereto, and the light splitting structure 300 can also be located at one side of the base substrate 100 away from the sub-pixels 200. For example, in the case where the display device provided by the embodiment of the present disclosure is a liquid crystal display device, the light splitting structure can be located at a light incident side of the sub-pixels, that is, between the backlight and the sub-pixels; and the light splitting structure can also be located at a light exit side of the sub-pixels.

For example, as shown in FIG. 1 and FIG. 2, one gap 201 located in the same row as and adjacent to a sub-pixel 200 which is among sub-pixels 200 with the same color corresponding to the same light splitting portion 310 and located in the same sub-pixel row group 2000 is overlapped with a sub-pixel 200 which is also among the sub-pixels 200 as mentioned above and located in a different row in the column direction, so as to realize brightness compensation of sub-pixels with the same color to the gap. Here, although 3D viewpoint image formed by sub-pixels with the same color located in different rows are not completely located in the black region formed after image light passes through the light splitting portion due to the existence of the gap, the light beams have certain diffusion effect, which can compensate the brightness of the black region caused by the gap. In this case, human eyes see that a compensated 3D viewpoint image is formed at the gap when watching.

For example, as shown in FIG. 1, each sub-pixel row group 2000 includes at least three rows of sub-pixels. For example, each sub-pixel row group includes M rows of sub-pixels, and the shifted direction of the (m+1)-th row of sub-pixels relative to the m-th row of sub-pixels is the same as the shifted direction of the (m+2)-th row of sub-pixels relative to the (m+1)-th row of sub-pixels, where M≥3, M≥(m+2), and m is a positive integer. For example, the shifted direction of the second row of sub-pixels relative to the first row of sub-pixels is the same as the shifted direction of the third row of sub-pixels relative to the second row of sub-pixels.

For example, in each sub-pixel row group 2000, the plurality of rows of sub-pixels are arranged in a stepped manner. For example, FIG. 1 illustratively shows that from the first row to the M-th row, the shifted direction of the sub-pixels is the direction indicated by the arrow in the X direction, but is not limited thereto, and can also be the opposite direction to the direction indicated by the arrow in the X direction.

For example, as shown in FIG. 1 and FIG. 2, each sub-pixel 200 includes a left edge 203 and a right edge 204 which are opposite to each other in the row direction and extend in the column direction, and illustratively, in the present disclosure, the direction indicated by the arrow in the X direction is right, and the opposite direction thereof is left. For example, each sub-pixel has a shape of rectangular, and the left edge and the right edge are two sides extending along the column direction.

For example, the light splitting portion 310 in the light splitting structure 300 includes a lenticular lens. For example, the lenticular lens includes two sides opposite to each other and extending along the column direction, and the two sides of each lenticular lens respectively coincide with the edges, which extend along the column direction, of two adjacent sub-pixels in at least one row of sub-pixels 200.

For example, as shown in FIG. 1 and FIG. 2, the two sides, which extend along the column direction, of the light splitting portion 310 can coincide with edges, extending in the column direction, of two adjacent sub-pixels 200 in the first row of sub-pixels 200 in each sub-pixel row group 2000. The embodiment of the present disclosure is not limited thereto, and the two sides, which extend along the column direction, of the light splitting portion 310 may not coincide with the edges, extending along the column direction, of the first row of sub-pixels in each sub-pixel row group, as long as the size of the light splitting portion along the row direction is basically equal to the pitch of sub-pixels along the row direction, and adjacent sub-pixel rows in each sub-pixel row group are shifted, that is, as long as brightness compensation for the gap between adjacent sub-pixels can be realized.

For example, as shown in FIG. 1, each sub-pixel row group 2000 includes a plurality of first color sub-pixels 210, a plurality of second color sub-pixels 220, and a plurality of third color sub-pixels 230. For example, the first color sub-pixels 210 can be sub-pixels which emit red light (i.e., red sub-pixels), the second color sub-pixels 220 can be sub-pixels which emit green light (i.e., green sub-pixels), and the third color sub-pixels 230 can be sub-pixels which emit blue light (i.e., blue sub-pixels). The embodiment of the present disclosure is not limited thereto, and the colors of light emitted from respective color sub-pixels can be interchanged. For example, the first color sub-pixels can be sub-pixels which emit blue light, the second color sub-pixels can be sub-pixels which emit red light, and the third color sub-pixels can be sub-pixels which emit green light.

For example, as shown in FIG. 1, the sub-pixels arranged along the row direction are sub-pixels with the same color, and the first color sub-pixel row, the second color sub-pixel row and the third color sub-pixel row are arranged sequentially and repeatedly along the column direction. For example, each sub-pixel row group 2000 includes 3N rows of sub-pixels, and N is a positive integer. FIG. 1 illustratively shows that each sub-pixel row group 2000 includes six rows of sub-pixels, which is not limited thereto, and each sub-pixel row group 2000 may include three rows of sub-pixels or nine rows of sub-pixels.

For example, as shown in FIG. 1, in each sub-pixel row group 2000, a plurality of display units 202 in sub-pixels 200 with different colors corresponding to one light splitting portion 310 form a continuous 3D image of one row without black regions and including a plurality of viewpoint regions, so as to avoid the occurrence of the moire and avoid affecting the display effect of the display device.

For example, the width of the gap 201 can be an integer multiple of the width of the display unit 202.

For example, a display unit corresponding to one light splitting portion refers to a display unit overlapped with the light splitting portion along the direction perpendicular to the base substrate. Among a plurality of rows of display units overlapped with one light splitting portion, the display units located in the same row can be display units included in the same sub-pixel or can be display units included in adjacent sub-pixels. For example, the number of display units included in each sub-pixel is a, and the width of the gap between adjacent sub-pixels can correspond to the sum of the widths of p display units continuously arranged, then the display units in each pixel row group corresponding to one light splitting portion are configured to display a 3D viewpoint images or (a+p) 3D viewpoint images.

For example, as shown in FIG. 1, in each sub-pixel row group 2000, sub-pixels 200 located in different rows and with the same color are configured to compensate for black region formed by the light splitting structure 300 and the gaps which are located on at least one side of a sub-pixel among the sub-pixels 200 with the same color and adjacent to the sub-pixel.

For example, as shown in FIG. 1, in each sub-pixel row group 2000, one gap 201 located in the same row as and adjacent to each color sub-pixel 200 is completely overlapped, in the column direction, with a part of a sub-pixel 200 located in a different row and with the same color as the sub-pixel 200 adjacent to the gap.

For example, as shown in FIG. 1, a spacing between the orthographic projections of adjacent first color sub-pixels 210 in the first row on the straight line extending in the X direction completely falls within the orthographic projection of the first color sub-pixel 210 in the fourth row on the straight line, so that the first color sub-pixel in the fourth row realizes compensation for the brightness of the gap between adjacent first color sub-pixels in the first row. Similarly, the second color sub-pixel 220 in the fifth row realizes compensation for the brightness of the gap between adjacent second color sub-pixels 220 in the second row, and the third color sub-pixel 230 in the sixth row realizes compensation for the brightness of the gap between adjacent third color sub-pixels 230 in the third row. In the embodiment of the present disclosure, the sub-pixels located in different rows and with the same color in each sub-pixel row group realize the brightness compensation for the gaps. When the human eyes are at a certain viewing distance, the image light emitted from sub-pixels with the same color is continuously distributed, while the image light emitted from sub-pixels of different colors is mixed to form a continuously distributed color image.

For example, as shown in FIG. 1, in each sub-pixel row group 2000, one gap 201 located in the same row as and adjacent to each color sub-pixel 200 is completely overlapped, in the column direction, with a part of sub-pixels 200 located in a different row and of a color different from the sub-pixel adjacent to the gap.

For example, as shown in FIG. 1, a spacing between the orthographic projections of adjacent first color sub-pixels 210 in the first row on the straight line extending in the X direction completely falls within the orthographic projection of the third color sub-pixel 230 in the third row on the straight line. For example, a spacing between the orthographic projections of adjacent first color sub-pixels 210 in the first row on the straight line extending in the X direction completely falls within the combination of the orthographic projection of the second color sub-pixel 220 in the second row on the straight line and the orthographic projection of the second color sub-pixel 220 in the fifth row on the straight line. Therefore, the gap between sub-pixels of a certain color in the same row is overlapped, in the Y direction, with sub-pixels with other two colors in different rows and the sub-pixel with the same color in different rows, so that color images can be displayed in the gap.

For example, as shown in FIG. 1, each sub-pixel row group includes six rows of sub-pixels, and the right edge of the sub-pixel 200 in the n-th row is aligned with the left edge of the sub-pixel 200 in the (n+3)-th row, and here, the sub-pixel 200 in the n-th row and the sub-pixel 200 in the (n+3)-th row are sub-pixels with the same color. For example, the right edge of the first color sub-pixel 210 in the first row is aligned with the left edge of the first color sub-pixel 210 in the fourth row, so as to at least ensure the brightness compensation of the sub-pixels with the same color to the gap.

For example, as shown in FIG. 1, the left edge of the sub-pixel 200 in the first row is aligned with the right edge of the sub-pixel in the third row, while the left edge of the sub-pixel in the fourth row is aligned with the right edge of the sub-pixel in the sixth row, and n is a positive integer not greater than 3.

For example, as shown in FIG. 1, among the three sub-pixels 200, which are overlapped with each other in the Y direction, in the first three rows or the last three rows of sub-pixels, the edge, away from the first sub-pixel 200 and extending along the Y direction, of the third sub-pixel 200, is aligned with the edge, away from the first sub-pixel 200, of the gap 201 that is located in the same row as and adjacent to the first sub-pixel 200, so that the size of the orthographic projection of all of these three sub-pixels on a straight line extending in the row direction is equal to the width of the light splitting portion along the row direction.

For example, as shown in FIG. 1, among the three sub-pixels 200, which are overlapped with each other in the Y direction, in the first three rows or the last three rows of sub-pixels, the ratio of the size of the orthographic projection of all of these three sub-pixels on the straight line extending in the row direction to the size of the orthographic projection of all of these three sub-pixels on the straight line extending in the column direction is in a range from 0.9 to 1.1, thus realizing the matching of the size ratio between the 3D image and the image displayed by the 2D display device.

For example, as shown in FIG. 1, in the first three rows or the last three rows of sub-pixels 200, a spacing between the orthographic projections of adjacent first color sub-pixels 210 on the straight line extending in the row direction completely falls within the orthographic projection of the third color sub-pixel 230 on the straight line, and the orthographic projection of the second color sub-pixel 220 on the straight line is only overlapped with a part of the above-mentioned spacing between the orthographic projections. For example, in the row direction, the ratio of the size of the overlapping part between the orthographic projection of the second color sub-pixel 220 and the above spacing between the orthographic projections to the size of the above spacing between the orthographic projections is 0.4-0.6.

For example, the ratio of the size of each sub-pixel 200 along the row direction to the size of the gap 201 along the row direction can be 2:1. In the first three rows or the last three rows of sub-pixels 200, the shifted size of each row of sub-pixels 200 relative to the previous row of sub-pixels 200 is ⅙ of the size of the sub-pixel 200 along the row direction, thus realizing the matching of the size ratio between the 3D image and the image displayed by the 2D display device.

The embodiment of the present disclosure is not limited thereto. In the first three rows or the last three rows of sub-pixels, the shifted size of the second row of sub-pixels relative to the first row of sub-pixels can be the same as or different from the shifted size of the third row of sub-pixels relative to the second row of sub-pixels.

For example, as shown in FIG. 1, in each sub-pixel row group 2000, image light emitted from the third row of sub-pixels 200 and image light emitted from the fourth row of sub-pixel 200 are different in color; under the condition of ensuring that the first row of sub-pixels 200 and the fourth row of sub-pixels 200 realize brightness compensation of the sub-pixels with the same color to the gap, the size of the overlapping part between the third row of sub-pixels and the fourth row of sub-pixels in the column direction can be reduced as much as possible, thus reducing color crosstalk as much as possible.

Figure 3:
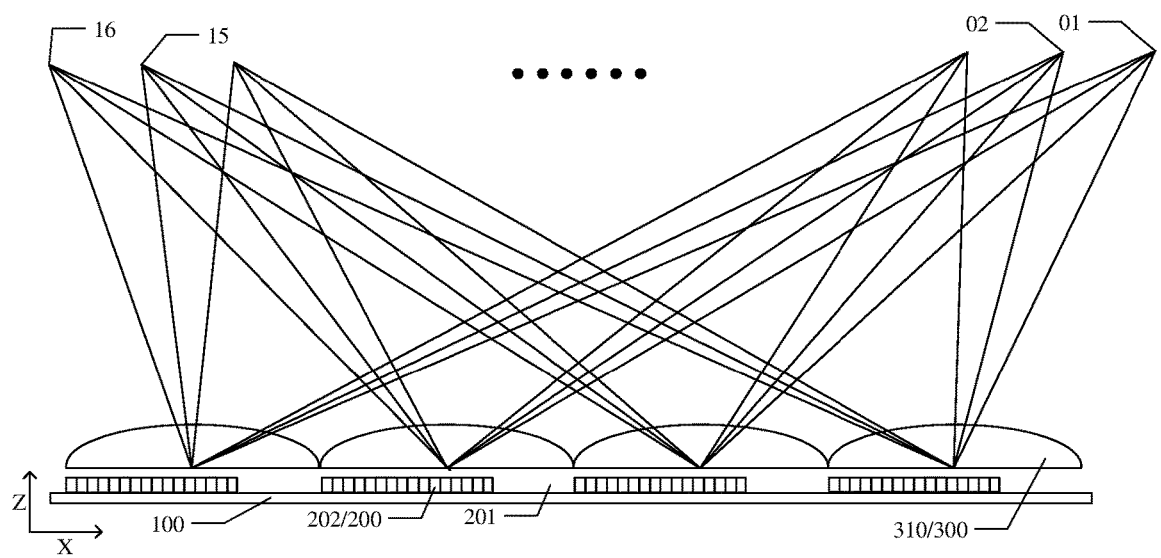
FIG. 3 is a schematic light path diagram of the display device shown in FIG. 2.
Figure 4:
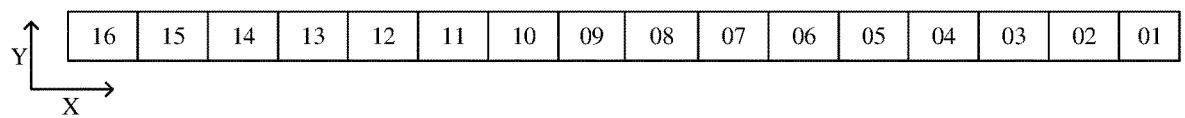
FIG. 4 is a schematic diagram of a plurality of viewpoint regions shown in FIG. 3.

For example, FIG. 3 is a schematic light path diagram of the display device shown in FIG. 2, and FIG. 4 is a schematic diagram of a plurality of viewpoint regions shown in FIG. 3. For example, as shown in FIG. 1 to FIG. 4, each sub-pixel 200 includes sixteen display units 202, and in the column direction, part of the display units 202, which are overlapped, in the sub-pixels 200 of different colors display corresponding contents to form a color image, and part of the display units 202, which are overlapped, in the sub-pixels 200 with the same color display the same contents to avoid image crosstalk.

For example, as shown in FIG. 1, twelve display units 202 of each first color sub-pixel 210 in the first row are overlapped with twelve display units 202 of the second color sub-pixel 220 in the second row in the column direction, eight display units 202 among the twelve display units 202 of each first color sub-pixel 210 in the first row are overlapped with eight display units 202 of the third color sub-pixel 230 in the third row in the column direction, while the other four display units 202 among the twelve display units 202 of each first color sub-pixel 210 in the first row are overlapped with the third color sub-pixel 230 in the sixth row in the column direction, so that the twelve display units of different colors which are overlapped serve as different monochrome display units 202 for forming, for example, twelve color viewpoint regions. The remaining four display units 202 of each first color sub-pixel 210 in the first row are overlapped with four display units 202 of the second color sub-pixel 220 in the fifth row in the column direction, and the remaining four display units 202 of each first color sub-pixel 210 in the first row are overlapped with four display units 202 of the third color sub-pixel 230 in the sixth row in the column direction, and the four display units which are overlapped serve as different monochrome display units 202 for forming, for example, four color viewpoint regions.

For example, part of the display units 202 of sub-pixels 200 of different colors opposite to the gap 201, in the column direction, between adjacent first color sub-pixels 210 in the first row display corresponding contents to form a color display image which filled the gap 201. For example, the width of the gap 201 can be 8 times the width of one display unit 202, and one light splitting portion 310 can correspond to the width of twenty-four display units 202. For example, one part of the gap 201 between adjacent first color sub-pixels 210 in the first row is overlapped with four display units 202 in the second color sub-pixel 220 in the second row in the column direction, the other part thereof is overlapped with four display units 202 in the second color sub-pixel 220 in the fifth row in the column direction, and the gap 201 is entirely overlapped, in the column direction, with eight display units 202 of the third color sub-pixel 230 in the third row and with eight display units of the first color sub-pixel 210 in the fourth row, so that eight display units 202 overlapped with the gap in the column direction form eight color viewpoint regions. In the embodiment of the present disclosure, the sub-pixels of different rows are shifted in each sub-pixel row group and the width of the light splitting portion is basically equal to the pitch of the sub-pixels, so that the color viewpoint regions formed by the shifted color sub-pixels in each pixel row group can cover the black regions formed by the gaps.

For example, as shown in FIG. 3 and FIG. 4, image light emitted from each sub-pixel 200 and image light compensated at the gap 201 between adjacent sub-pixels in the same row can form 16 viewpoints 01-16 after passing through the light splitting structure 300 (for example, a viewpoint can refer to an intersection point of optical axes of light beams which are emitted from the display units displaying the same 2D content position information and pass through different light splitting portions, the above-mentioned "optical axis" refers to the center line of a light beam, and a viewpoint region in the embodiment of the present disclosure can refer to a region whose center is the viewpoint).

For example, in each sub-pixel row group 2000, the display units 202, located in one column, among the plurality of sub-pixels 200 corresponding to each light splitting portion 310 display the same 2D content position information, while the display units 202 in sub-pixels 200 corresponding to different light splitting portions 310 display different 2D content position information. For example, the display units 202 corresponding to the same positions of different light splitting portions 310 display different 2D content position information, and different light splitting portions 310 form different 3D content images in the same viewpoint region. For example, different light splitting portions 310 form different images in the viewpoint region 1.

For example, each sub-pixel includes a display units, and the width of the gap between adjacent sub-pixels can correspond to the sum of the widths of p display units continuously arranged; in each pixel row group corresponding to one light splitting portion, viewpoints $(a+1) \sim (a+p)$ can be displayed at the gaps by controlling the 2D content position information displayed by the display units overlapped with the gaps, and the display device can display (a+p) 3D viewpoints. Compared with a display device in which there is no gap in the sub-pixel arrangement in the same row of sub-pixels and the width of the light splitting portion along the row direction is basically the same as the size of the sub-pixel along the row direction, the embodiment of the present disclosure, the brightness at the gap can be compensated by shifting different rows of sub-pixels in each sub-pixel row group, and the number of viewpoints corresponding to each light splitting portion can also be increased, so as to make the 3D display picture more delicate. Of course, the embodiments of the present disclosure are not limited thereto, and the number of viewpoint regions formed by the image light emitted from each sub-pixel row group after passing through the light splitting structure can be the same as the number of display units included in each sub-pixel by adjusting the corresponding relationship between the images displayed by the display units in each sub-pixel and the images displayed by the display units which compensate the gap.

Figure 5:
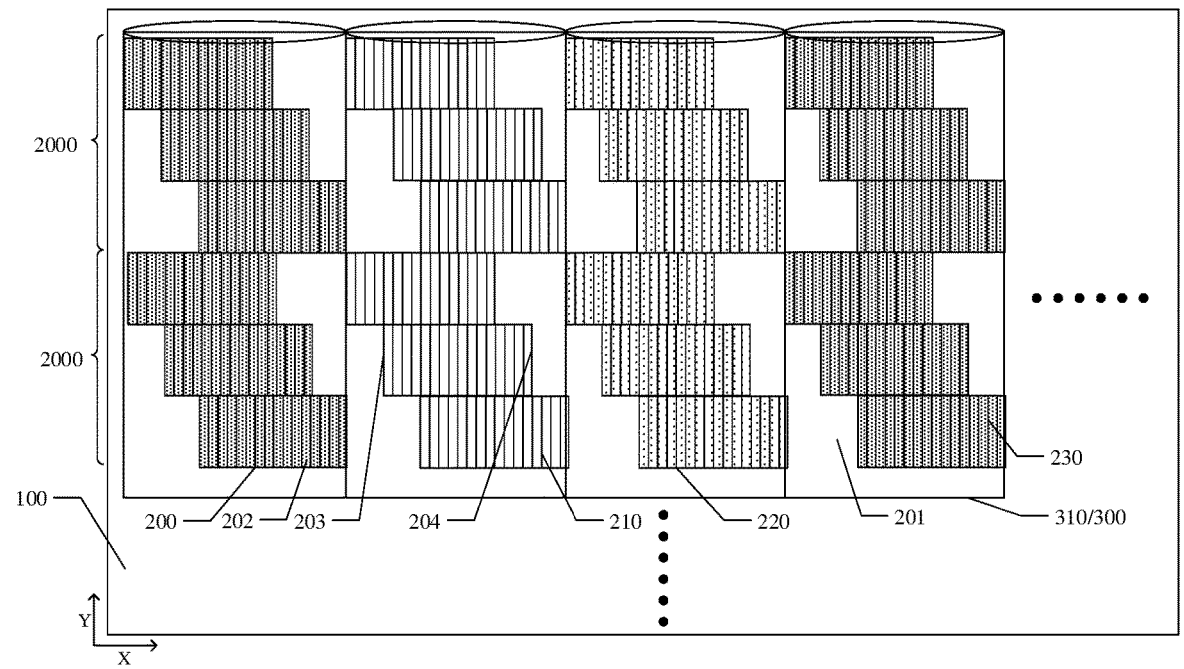
FIG. 5 is a partial plan structural view of a display device according to another example of an embodiment of the present disclosure.

For example, FIG. 5 is a partial plan structural view of a display device according to another example of an embodiment of the present disclosure. As shown in FIG. 5, the display device provided in the present example is different from the example shown in FIG. 1 in that: in the present example, the plurality of first color sub-pixels 210, the plurality of second color sub-pixels 220 and the plurality of third color sub-pixels 230 are arranged sequentially and repeatedly along the row direction, and sub-pixels 200 located in different rows and with the same color are overlapped in the column direction, while sub-pixels 200 located in different rows and of different colors are not overlapped in the column direction. The sub-pixel arrangement manner in the example shown in FIG. 5 is different from the sub-pixel arrangement manner shown in FIG. 1, but the positional relationship between the gap and sub-pixels in rows different from the gap in each sub-pixel row group, and the size relationship between the light splitting portion and the pitch of the sub-pixels in the example shown in FIG. 5, are the same as those in the example shown in FIG. 1. Therefore, in the example shown in FIG. 5, by adjusting the positional relationship between gaps and sub-pixels in rows different from the gaps, and the size relationship between the pitches of the sub-pixels and the light splitting portions, the brightness compensation at the gaps between the sub-pixels with discontinuous illumination can be realized, thereby eliminating the moire caused by the discontinuous illumination of the sub-pixels. Furthermore, in the example shown in FIG. 5, the number of the plurality of viewpoint regions formed by image light emitted from each sub-pixel row group after passing through the light splitting structure can be the same as the number of display units included in each sub-pixel, and viewpoint regions displayed by display units that compensate the brightness of the gap, in addition to the viewpoint regions corresponding to the display units in each sub-pixel, can also be included, which is not limited in the present example.

For example, as shown in FIG. 5, in each sub-pixel row group 2000, one gap 201 located in the same row as and adjacent to each color sub-pixel 200 is completely overlapped, in the column direction, with a part of a sub-pixel 200 located in a different row and with the same color as the sub-pixel adjacent to the gap, thereby realizing the compensation for the brightness of the gap by sub-pixels with the same color in each sub-pixel row group, so that sub-pixels with the same color in each sub-pixel row group can continuously emit light during display.

For example, as shown in FIG. 5, in the case where each sub-pixel row group 2000 includes at least three rows of sub-pixels 200, in the column direction, part of one gap 201 located in the same row as and adjacent to each color sub-pixel 200 is overlapped with a sub-pixel with the same color as the sub-pixel adjacent to the gap and in an adjacent row, and the other part of the gap 201 as mentioned above is overlapped with a sub-pixel 200 with the same color as the sub-pixel adjacent to the gap and in a non-adjacent row. Of course, the embodiment of the present disclosure is not limited thereto, and each sub-pixel row group can also include two rows of sub-pixels, and the spacing between the orthographic projections of adjacent sub-pixels in one row of sub-pixels on a straight line along the row direction completely falls within the orthographic projection of the other row of sub-pixels on the straight line.

For example, as shown in FIG. 5, in each sub-pixel row group 2000, the size of the orthographic projection of sub-pixels 200 with the same color on the straight line extending along the row direction is basically the same as the width of the light splitting portion 310.

For example, as shown in FIG. 5, each sub-pixel 200 includes a left edge 203 and a right edge 204 which are opposite to each other in the row direction and extend in the column direction, and in two rows of sub-pixels 200 which are respectively located in adjacent sub-pixel row groups 2000 and are adjacent to each other, the right edge of one row of sub-pixels 200 is aligned with the left edge of the other row of sub-pixels 200 of different colors.

For example, FIG. 5 illustratively shows that each sub-pixel row group 2000 includes three rows of sub-pixels, and the right edge of the first color sub-pixel 210 in the third row of sub-pixels in the first sub-pixel row group 2000 is aligned with the left edge of the second color sub-pixel 220 in the first row of sub-pixels in the second sub-pixel row group 2000.

For example, as shown in FIG. 5, in two rows of sub-pixels 200 which are respectively located in adjacent sub-pixel row groups 2000 and are adjacent to each other, in the case where the right edge of one row of sub-pixels 200 is aligned with the right side of the light splitting portion 310 in the column direction, the left edge of the other row of sub-pixels 200 is aligned with the left side of the light splitting portion 310 in the column direction.

For example, as shown in FIG. 5, in two rows of sub-pixels 200 which are respectively located in adjacent sub-pixel row groups 2000 and are adjacent to each other, the gap 201 between two adjacent sub-pixels 200 in one row of sub-pixels 200 is completely overlapped with a sub-pixel 200 in the other row of sub-pixels 200 in the column direction. That is, in two rows of sub-pixels 200 which are respectively located in adjacent sub-pixel row groups 2000 and are adjacent to each other, the spacing between the orthographic projections of two adjacent sub-pixels 200 in one row of sub-pixels 200 on a straight line extending in the row direction completely falls within the orthographic projection of a sub-pixel 200 in the other row of sub-pixels 200 on the straight line.

For example, as shown in FIG. 5, in adjacent sub-pixel row groups 2000, the orthographic projection of the k-th row of sub-pixels in one sub-pixel row group 2000 on the straight line extending along the row direction completely coincides with the orthographic projection of the k-th row of sub-pixels in the other sub-pixel row group 2000, where k is a positive integer less than or equal to the number of sub-pixel rows in each sub-pixel row group.

Figure 6:
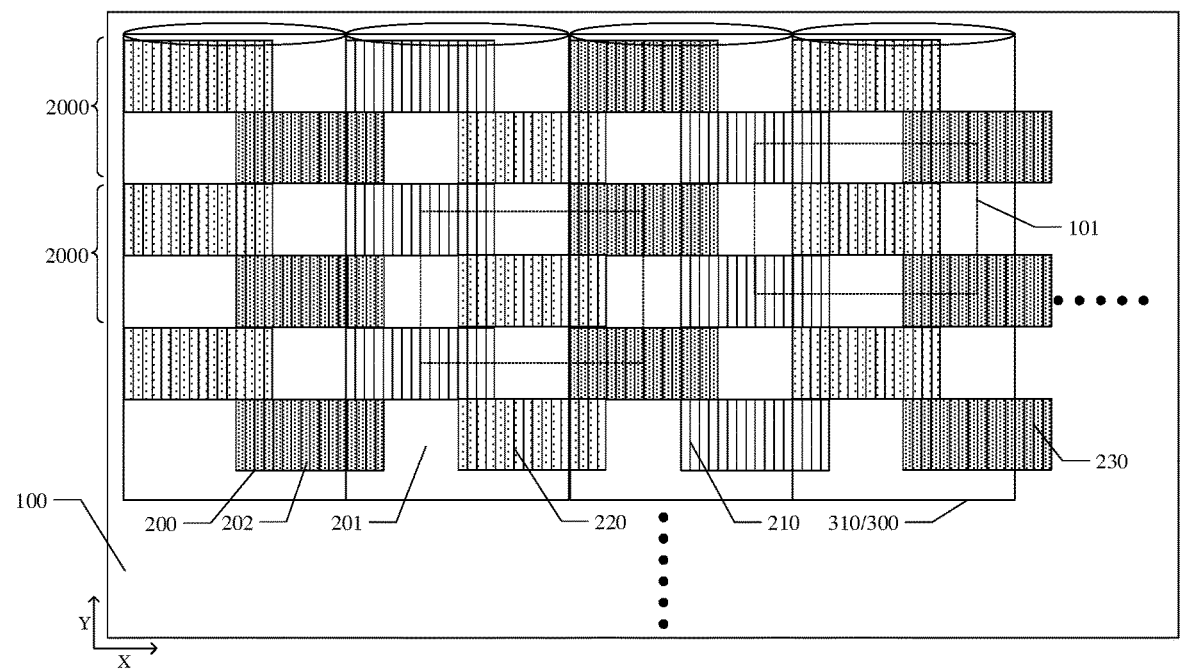
FIG. 6 is a partial plan structural view of a display device according to another example of an embodiment of the present disclosure.

For example, FIG. 6 is a partial plan structural view of a display device according to another example of an embodiment of the present disclosure. As shown in FIG. 6, the display device provided in the present example is different from the example shown in FIG. 1 in that: in the present example, the plurality of first color sub-pixels 210, the plurality of second color sub-pixels 220 and the plurality of third color sub-pixels 230 are repeatedly arranged along the row direction, and in each sub-pixel row group 2000, one gap 201 located in the same row as and adjacent to each color sub-pixel 200 is completely overlapped with a part of a sub-pixel 200 in an adjacent row and of a color different from the sub-pixel adjacent to the gap in the column direction. For example, in each sub-pixel row group 2000, the spacing between the orthographic projections of the first color sub-pixel 210 and the third color sub-pixel 230 in one row of sub-pixels 200 on a straight line extending along the row direction completely falls within the orthographic projection of a second color sub-pixels 220 in an adjacent row on the straight line. The sub-pixel arrangement manner in the example shown in FIG. 6 is different from the sub-pixel arrangement manner shown in FIG. 1, but the positional relationship between the gap and sub-pixels in different rows from the gap in each sub-pixel row group, and the size relationship between the light splitting portion and the pitch of the sub-pixels in the example shown in FIG. 6, are the same as those in the example shown in FIG. 1. Therefore, in the example shown in FIG. 6, by adjusting the positional relationship between gaps and sub-pixels in different rows from the gaps, and the size relationship between the pitches of the sub-pixels and the light splitting portions, the brightness compensation at the gaps between the sub-pixels with discontinuous illumination can be realized, thereby eliminating the moire caused by the discontinuous illumination of the sub-pixels. Furthermore, in the example shown in FIG. 6, the number of the plurality of viewpoint regions formed by image light emitted from each sub-pixel row group after passing through the light splitting structure can be the same as the number of display units included in each sub-pixel, and viewpoint regions displayed by display units that compensate the brightness of the gap, in addition to the viewpoint regions corresponding to the display units in each sub-pixel, can also be included, which is not limited in the present example.

For example, as shown in FIG. 6, the plurality of sub-pixels 200 are divided into a plurality of sub-pixel groups extending along the column direction and arranged along the row direction, each sub-pixel group includes a first sub-pixel column, a second sub-pixel column and a third sub-pixel column which extend along the column direction and are arranged in turn, the first sub-pixel column includes a plurality of first color sub-pixels 210 arranged along the column direction, the second sub-pixel column includes a plurality of second color sub-pixels 220 arranged along the column direction, and the third sub-pixel column includes a plurality of third color sub-pixels 230 arranged along the column direction. In each sub-pixel group, taking the centers of two adjacent first color sub-pixels 210 and the centers of two third color sub-pixels 230 respectively adjacent to the two adjacent first color sub-pixels 210 in the row direction as four vertices of a virtual quadrilateral 101, and the center of a second color sub-pixel 220 surrounded by the above four sub-pixels 200 is located at the center of the virtual quadrilateral 101; moreover, the distance between the centers of two adjacent virtual quadrilaterals 101, which are respectively located in two adjacent sub-pixel groups, along the column direction, is one half of the side length of the virtual quadrilateral 101.

For example, as shown in FIG. 6, in the row direction, the ratio of the size of the overlapping part between the orthographic projection of the first color sub-pixel 210 on a straight line extending in the row direction and the orthographic projection of the second color sub-pixel 220 on the straight line to the size of the overlapping part between the orthographic projection of the third color sub-pixel 230 on the straight line and the orthographic projection of the second color sub-pixel 220 on the straight line is in a range from 0.9 to 1.1. For example, as shown in FIG. 6, the midpoint of the gap 201 between the first color sub-pixel 210 and the third color sub-pixel 230 which are adjacent to each other in the same row and the midpoint of the second color sub-pixel 220 overlapped with the gap 201 are located on the same straight line extending along the column direction.

For example, as shown in FIG. 6, the sides of each light splitting portion 310 extending in the column direction coincide with the edges of some first color sub-pixels 210 or some third color sub-pixels 230 extending in the column direction. For example, two sides of each light splitting portion 310 which are opposite to each other in the row direction and extend in the column direction coincide with edges of two adjacent sub-pixels 200 of different colors (for example, the first color sub-pixel 210 and the third color sub-pixel 230) located in the same row, respectively.

For example, as shown in FIG. 6, each sub-pixel row group 2000 includes two rows of sub-pixels.

Figure 7:
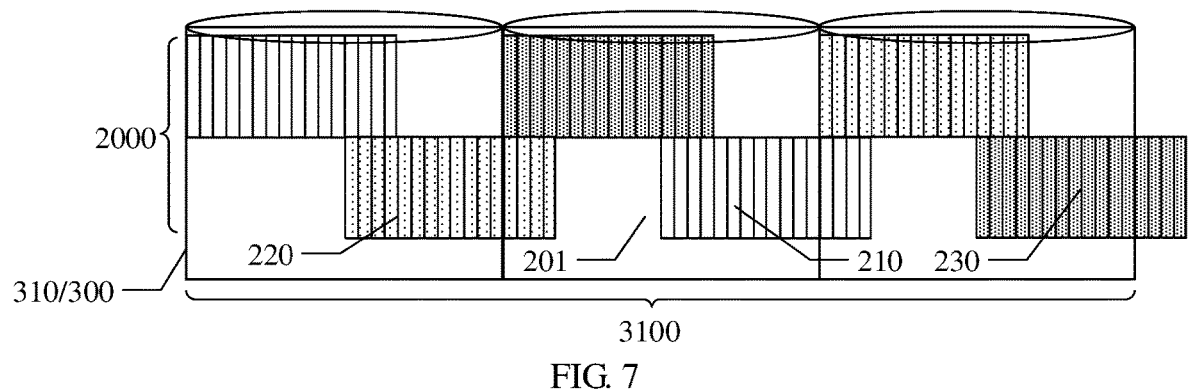
FIG. 7 is a plan structural view of some sub-pixels and light splitting potions shown in FIG. 6.

For example, FIG. 7 is a plan structural view of some sub-pixels and light splitting potions shown in FIG. 6. As shown in FIG. 6 and FIG. 7, in each sub-pixel row group 2000, one part of image light emitted from each color sub-pixel 200 in the second row is overlapped with image light emitted from sub-pixels 200 with the same color in the first row, while the other part of the image light emitted from the each color sub-pixel 200 in the second row is used to compensate the brightness of the gap 201 between the sub-pixels in the first row. Therefore, the plurality of viewpoint regions formed after the image light emitted from each sub-pixel row group passing through the light splitting structure 300 are continuously distributed, and the moire will not occur, thus improving the display effect of the display device.

For example, as shown in FIG. 7, the light splitting structure 300 includes light splitting column groups 3100, each light splitting column group 3100 includes at least two light splitting portions 310, and sub-pixels with the same color corresponding to the same light splitting portion column group 3100 and located in the same sub-pixel row group 2000 respectively correspond to different regions in different light splitting portions 310. For example, as shown in FIG. 7, the first color sub-pixel 210 in the first row corresponds to the left region of a corresponding light splitting portion 310, and the first color sub-pixel 210 in the second row corresponds to the right region of a corresponding light splitting portion 310.

For example, as shown in FIG. 7, for sub-pixels 200 corresponding to a same light splitting portion column group 3100 and located in a same sub-pixel row group 2000, one gap 201, which is located in the same row as and adjacent to each color sub-pixel corresponding to one light splitting portion 310, corresponds to a region relative to the one light splitting portion 310, the same region relative to another light splitting portion 310 is overlapped in the column direction with a sub-pixel 200 with the same color as the each color sub-pixel 200 and corresponding to the another light splitting portion 310. For example, as shown in FIG. 7, the gap 201 at the right side of the first color sub-pixel 210 in the first row corresponds to the right region of the first light splitting portion 310, while the first color sub-pixel 210 in the second row corresponds to the right region of the second light splitting portion 310, so the viewpoint region formed by the first color sub-pixel 210 in the second row through the second light splitting portion 310 can perform a brightness compensation of light with the same color on the gap at the right side of the first color sub-pixel 210 in the first row.

For example, as shown in FIG. 7, in each sub-pixel row group 2000, one gap 201 located in the same row as and adjacent to each color sub-pixel 200 is overlapped with a sub-pixel 200 located in a different row and of a different color from the sub-pixel adjacent to the gap in the column direction, to realize brightness compensation of a different color of light for the gap, thereby forming a color image in the viewpoint region corresponding to the gap.

In the case where the number of viewpoint regions formed by each light splitting portion is f: in the example shown in FIG. 1, a plurality of display units corresponding to one light splitting portion and located in the same pixel row group are taken as a group, and the number of color viewpoint regions that display units of different colors in the group of display units are configured to display is f; in the example shown in FIG. 5, a plurality of display units corresponding to adjacent three light splitting portions and located in the same pixel row group are taken as a group, the adjacent three light splitting portions as mentioned above are three light splitting portions respectively corresponding to the first color sub-pixel column, the second color sub-pixel column and the third color sub-pixel column which are adjacently arranged, and the number of color viewpoint regions that display units of different colors in the group of display units are configured to display is f; in the example shown in FIG. 6, a plurality of display units corresponding to adjacent three light splitting portions and located in the same pixel row group are taken as a group, that is, as shown in FIG. 7, and the number of color viewpoint regions that display units of different colors in the group of display units are configured to display is f.

The embodiments of the present disclosure are not limited to the sub-pixel arrangement manners as shown in FIG. 1, FIG. 5 and FIG. 6. For example, in addition to the sub-pixel arrangement manners shown in the drawings, the pixel arrangement in which sub-pixels with the same color are arranged along the column direction as shown in FIG. 6 can be replaced by a pixel arrangement in which three kinds of color sub-pixels are arranged sequentially and repeatedly in the column direction and sub-pixels with the same color are arranged in the row direction, or, the pixel arrangement in which sub-pixels with the same color are arranged along the column direction as shown in FIG. 6 can be replaced by a pixel arrangement in which three kinds of color sub-pixels are arranged sequentially and repeatedly in the column direction and the row direction remains unchanged, without being limited in the embodiments of the present disclosure. The embodiments of the present disclosure are not limited to that the shape of the sub-pixel is rectangular, as long as: each sub-pixel row group includes at least two rows of sub-pixels, a gap is provided between two adjacent sub-pixels in each row of sub-pixels, two adjacent rows of sub-pixels in each sub-pixel row group are shifted from each other in the row direction so that sub-pixels in one row of sub-pixels and the gap between two adjacent sub-pixels in another row of sub-pixels are overlapped in the column direction, the ratio of the size of each of the plurality of light splitting portions along the row direction to the pitch of the plurality of sub-pixels is in a range from 0.9 to 1.1, and by adjusting the positional relationship between gap and sub-pixel in different row from the gap, and the size relationship between the pitches of the sub-pixels and the light splitting portions, the brightness compensation at the gaps between the sub-pixels with discontinuous illumination can be realized.

The display device provided by the embodiments of the present disclosure can be a liquid crystal display device, an organic light emitting diode display device, a micro light emitting diode display device, a mini light emitting diode display device, etc., without being limited in the embodiments of the present disclosure.

Figure 8:
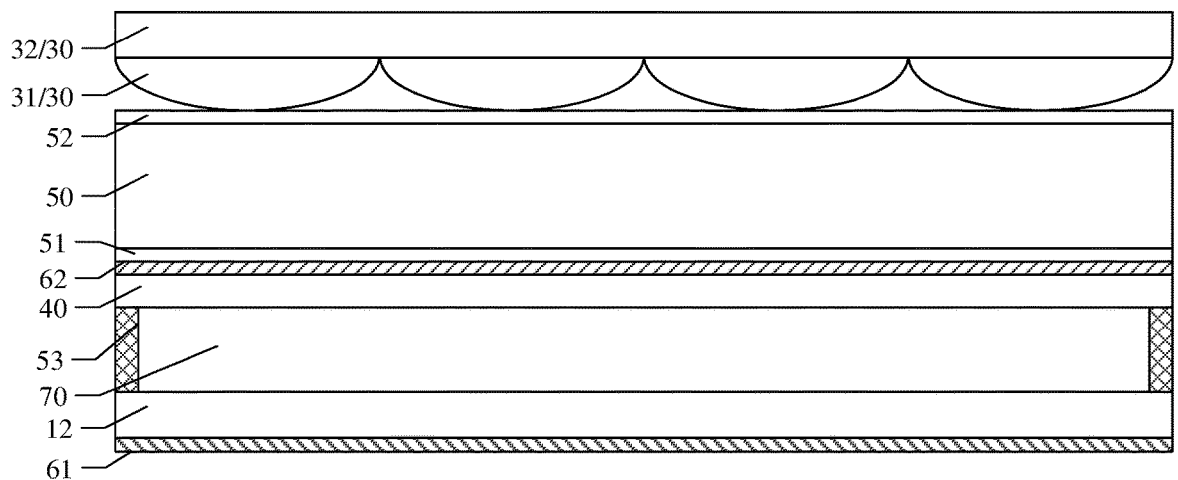
FIG. 8 is a partial cross-sectional structural view of a display device.

FIG. 8 is a partial cross-sectional structural view of a display device. As shown in FIG. 8, the display device can be a liquid crystal display device, which includes an array substrate 12, an opposing substrate 40, a liquid crystal layer 70 located between the array substrate 12 and the opposing substrate 40, and a frame sealant 53 encapsulating the liquid crystal layer 70. For example, the liquid crystal display device further includes a first polarization layer 61 disposed at one side of the array substrate 12 away from the opposing substrate 40 and a second polarization layer 62 disposed at one side of the opposing substrate 40 away from the array substrate 12. The display device further includes a light splitting structure 30 located at one side of the second polarization layer 62 away from the opposing substrate 40, and the light splitting structure 30 includes a substrate 32 and a plurality of light splitting portions 31 located at one side of the substrate 32 facing the opposing substrate 40. A photo spacer layer 50 is further disposed between the light splitting structure 30 and the opposing substrate 40, one side of the photo spacer layer 50 is attached to one side of the second polarization layer 62 away from the opposing substrate 40 by a first optical adhesive 51, and the other side of the photo spacer layer 50 is attached to the light splitting portions 31 by a second optical adhesive 52.

In research, the inventors of the present application have noticed that in the case where the size of the sub-pixel of the display device shown in FIG. 8 is in the range of 40 to 60 microns, in order to increase the density of viewpoints by one viewpoint between the left and right eyes, that is, the viewpoint interval is in the range from 30 to 40 mm, the photo spacer layer 50 needs to have a thickness from 3 to 5 mm. In order to ensure the flatness and optical characteristics of the light splitting structure 30 and the opposing substrate 40 in the display device in the process of alignment and attachment, the photo spacer layer 50 often needs to use optical grade glass, which not only increases the cost and weight of the display device including the light splitting structure, but also make the display device unable to be light and thin, thus greatly limiting the popularization and application of the display device.

For example, when using a display panel with a high pixel per inch (PPI) for 3D display, it is beneficial to increasing the number of 3D display viewpoints and realizing naked-eye 3D display with dense viewpoints in smooth transition, and it can also reduce the thickness of the 3D device while meeting the viewpoint density. However, due to the limitation of the capability of the manufacturing process of the liquid crystal display panel, the improvement of PPI is limited. By adopting a display device provided with sub-pixels having a plurality of display units (that is, the sub-pixel is subdivided to form a plurality of display units), ultra-multi-viewpoint naked-eye 3D display can be realized through multi-gray-scale drive rendering. However, with the smaller sub-pixels and the greater number of display units formed by sub-pixel subdivision, higher requirements are put forward for the alignment and attachment of 3D display. And in order to solve the alignment problem between sub-pixels and light splitting structure in high PPI display panel, so as to ensure and improve 3D display effect, is an urgent problem to be solved in current naked-eye 3D display technology.

Figure 9:
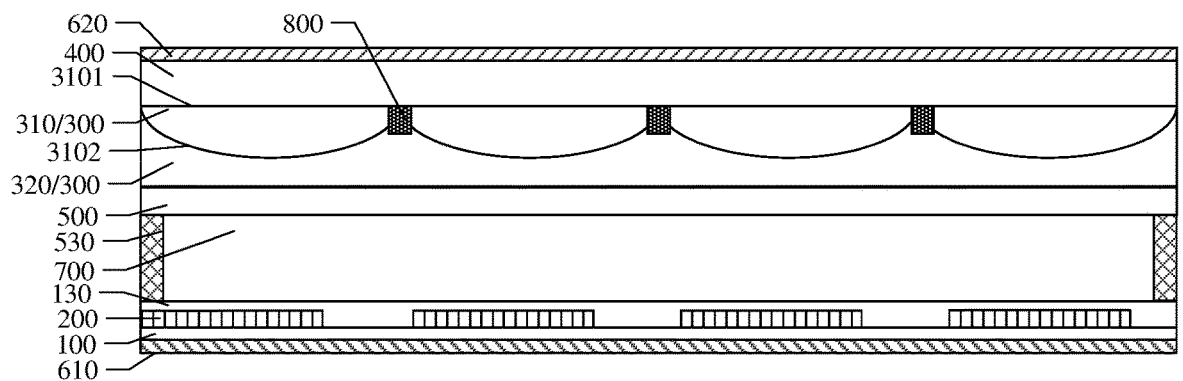
FIG. 9 is a partial cross-sectional structural view of a display device according to an example of another embodiment of the present disclosure.

FIG. 9 is a partial cross-sectional structural view of a display device according to an example of another embodiment of the present disclosure. As shown in FIG. 9, the display device further includes an opposing substrate 400 located at one side of the sub-pixels 200 away from the base substrate 100, the opposing substrate 400 is arranged opposite to the base substrate 100, and the light splitting structure 300 is formed between the opposing substrate 400 and the base substrate 100 by patterning. In the present embodiment, the positional relationship between the sub-pixels and the gaps in different rows, and the size relationship between the light splitting portion and the pitch of the sub-pixels can be the same as those in the embodiments shown in FIGS. 1-7, and details will not be repeated here.

For example, as shown in FIG. 9, the display device can be a liquid crystal display device, and the display device further includes a liquid crystal layer 700 located between the base substrate 100 and the opposing substrate 400, and a frame sealant 530 encapsulating the liquid crystal layer 700. For example, the liquid crystal display device further includes a first polarization layer 610 disposed at one side of the base substrate 100 away from the opposing substrate 400 and a second polarization layer 620 disposed at one side of the opposing substrate 400 away from the base substrate 100. For example, a planarization layer 500 is provided at one side of the light splitting structure 300 facing the liquid crystal layer 700, and an insulating layer 130 is provided at one side of the sub-pixels 200 away from the base substrate 100.

For example, as shown in FIG. 9, the light splitting portion 310 includes a lenticular lens, and a light shielding structure 800 is provided between adjacent lenticular lenses to prevent crosstalk of image light emitted from the sub-pixels 200. For example, the light shielding structure 800 is a strip structure arranged between adjacent lenses.

For example, as shown in FIG. 9, the lenticular lens 310 includes a planar side 3101 and a convex side 3102, and the light splitting structure 300 further includes a filling portion 320 located at the convex side 3102 of the lenticular lens, the filling portion 320 is in contact with the convex side 3102 of the lenticular lens 310, the surface of the filling portion 320 away from the lenticular lens 310 is a planar surface, and the refractive index of the lenticular lens 310 is greater than the refractive index of the filling portion 320.

Figure 10A:
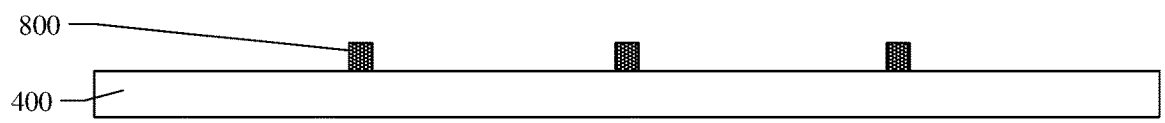
FIGS. 10A-10D are process flow diagrams of forming a light splitting structure on an opposing substrate.

For example, FIGS. 10A-10D are process flow diagrams of forming a light splitting structure on an opposing substrate. As shown in FIG. 10A, firstly, a light shielding layer is spin-coated on the opposing substrate 400, and a light shielding structure 800 is formed by exposing the light shielding layer. For example, the light shielding structure 800 is located at the intersection of the light splitting portions or sub-pixels. For example, the center of the light shielding structure, the boundary of the light splitting portions and the boundary of the sub-pixels are aligned along the direction perpendicular to the opposing substrate.

Figure 10B:
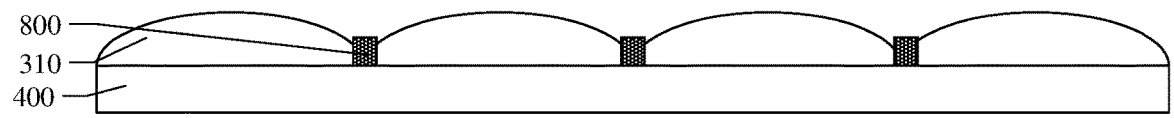

For example, as shown in FIG. 10B, an optical resin layer with high refractive index is spin-coated on the surface of the opposing substrate 400 formed with the light shielding structure 800, and the refractive index of the optical resin layer with high refractive index can be in the range from 1.56 to 1.65. For example, the optical resin layer with high refractive index can be processed by photolithography thermal reflow (low temperature thermal reflow) or grey tone exposure, etc., to form the light splitting portions 310 with lens appearance.

Figure 10C:
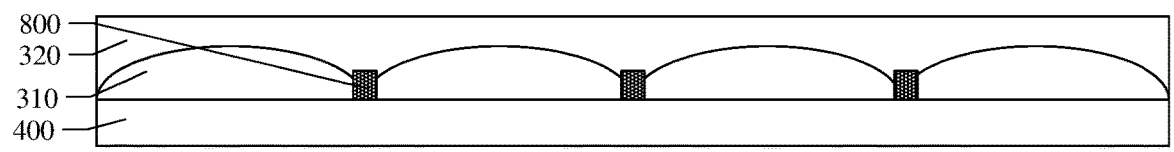
Figure 10D:
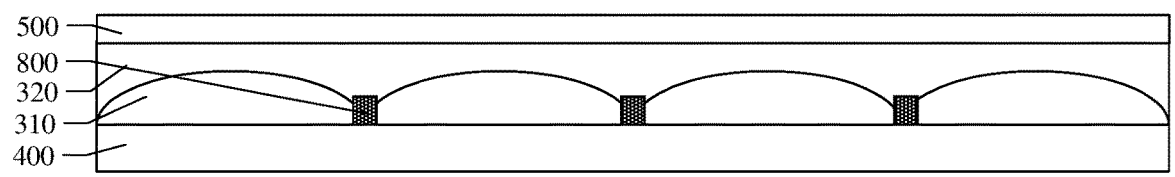

For example, as shown in FIG. 10C, a low resin layer with a certain thickness is spin-coated on the light splitting portions 310 with lens appearance, so as to serve as the filling portion 320.

For example, as shown in FIG. 10C, a planarization layer 500 is formed at one side of the filling portion 320 away from the light splitting portions 310, so as to further planarize the light splitting portions 310. In the embodiment of the present disclosure, after forming the light splitting structure on the opposing substrate, the opposing substrate and the base substrate are cell-assembled.

Figure 11:
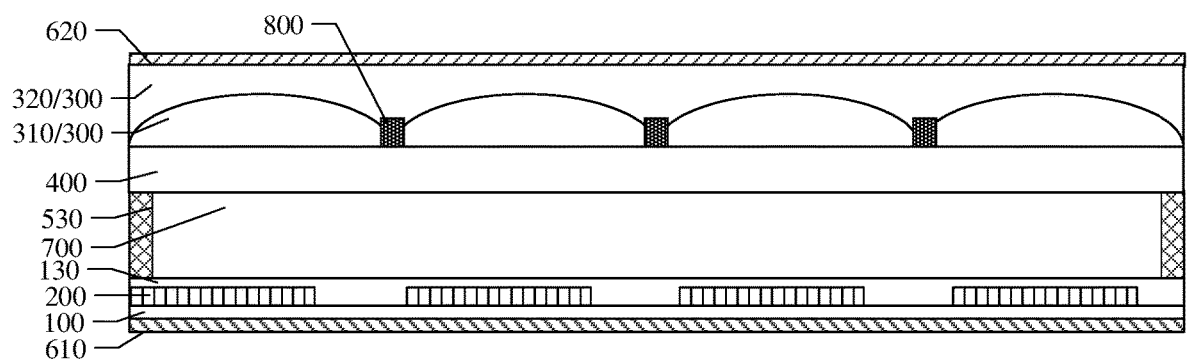
FIG. 11 is a partial cross-sectional structural view of a display device according to another example of another embodiment of the present disclosure.

For example, FIG. 11 is a partial cross-sectional structural view of a display device according to another example of another embodiment of the present disclosure. As shown in FIG. 11, the present example is different from the example shown in FIG. 9 in that the light splitting structure 300 is formed by patterning at one side of the opposing substrate 400 away from the base substrate 100. For example, as shown in FIG. 9, the light splitting structure 300 is formed on the opposing substrate 400 after the opposing substrate 400 and the base substrate 100 are cell-assembled, and the methods of forming the light splitting portions 310 and the filling portion 320 on the opposing substrate 400 in the present example are the same as the methods of forming the light splitting portions 310 and the filling portion 320 in the example shown in FIG. 9, and details will not be repeated here. For example, after the filling portion 320 is formed on the opposing substrate 400, a second polarizer 620 is attached onto one side of the filling portion 320 away from the light splitting portions 310.

In the embodiment of the disclosure, suitable photo-curing resin materials with different refractive indexes are selected as materials for forming the light splitting portions and the filling portion, and the light splitting portions are patterned on the display panel by adopting a technological process, such as photolithography thermal reflow or grey tone exposure, etc., so that the integration of the display panel and the light splitting structure is realized. Because there is no need to separately align and attach the light splitting structure and the display panel, on the one hand, the process compatibility between the light splitting structure and the display panel is realized, and on the other hand, the panel cell-assembling process is adopted to realize the alignment between the sub-pixels and the light splitting portions, which solves the problem of alignment difficulty in the split naked-eye 3D display device, is beneficial to improving the alignment accuracy of the 3D display device, and is beneficial to the thinning and low-cost production of the 3D display device.

The embodiments of the present disclosure are not limited to the case in which the display device is a liquid crystal display device. For example, the display device can also be an organic light emitting diode display device, and the opposing substrate can be a cover plate.

Figure 12:
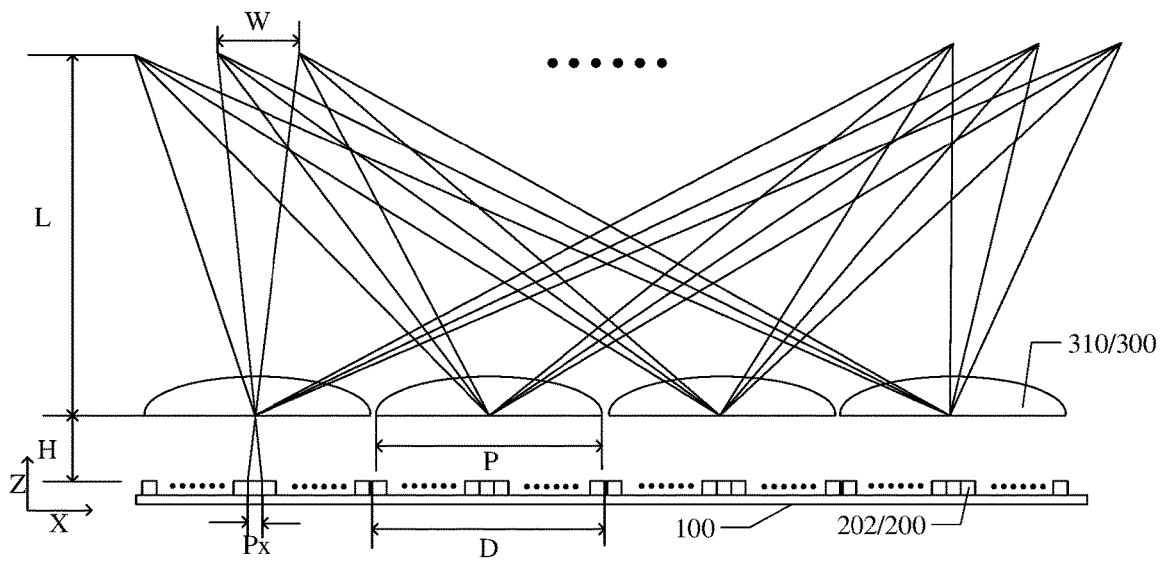
FIG. 12 is a schematic diagram of a light path of the display device shown in FIG. 11.

For example, FIG. 12 is a schematic diagram of light path of the display device shown in FIG. 11. For example, as shown in FIG. 12, the size of the sub-pixel 200 in the X direction is D to realize the Retina resolution (the so-called "Retina" is a display standard, which compresses more sub-pixels into one screen to achieve higher resolution and improve the fineness of screen display) at the viewing distance L. In this case, the size D of the sub-pixel 200 and the viewing distance L satisfy the relationship: D≤L*tan(1/60*3.1415926/180), so as to ensure that the retina 3D angular resolution can be obtained (the 3D image resolution available to human eyes at the viewing distance of the display device can reach the retina level). For example, as shown in FIG. 12, the interval between viewpoints formed by the plurality of display units 202 in the sub-pixels 200 corresponding to each light splitting portion 310 through the light splitting portion 319 is W, the distance between the sub-pixel 200 and the light splitting portion 310 is H, and the size of the display unit 202 in the X direction is Px, then the viewing distance L, the viewpoint interval W, the distance H and the size Px of the display unit satisfy the relationship:

$$H=Px*L/W.$$

For example, as shown in FIG. 12, each light splitting portion 310 has a certain shrinkage relation with respect to the size of a corresponding sub-pixel 200, and the shrinkage ratio satisfies P/D=L/(L+H), the light splitting portion 310 is, for example, a lenticular lens, and the aperture P of the lenticular lens satisfies P=L*D/(L+H), where D is the size of the sub-pixel along the X direction.

For example, as shown in FIG. 12, in the case where the size Px of each display unit 202 is in the range from 5 to 10 microns, the viewing distance L is in the range from 300 to 600 mm, and the viewpoint interval W is in the range from 10 to 20 mm, the distance H between the display unit 202 and the light splitting portion 310 can be reduced to 0.5 mm-80 microns. Therefore, different light splitting structures can be selected according to the distance between the display unit and the light splitting portion.

For example, in the case where the size Px of each display unit 202 is 9.75 microns, the viewing distance L is 500 mm, and the viewpoint interval W is 10 mm, the distance H between the display unit 202 and the light splitting portion 310 can be 0.5 mm. In this case, the light splitting structure can be formed by patterning at one side of the opposing substrate away from the base substrate to realize the integration of the light splitting structure and the display panel including the display units, that is, the external light splitting structure type 3D device structure is adopted.

For example, in the case where the size Px of each display unit 202 is 5 microns, the viewing distance L is 300 mm, and the viewpoint interval W is 20 mm, the distance H between the display unit 202 and the light splitting portion 310 can be 75 microns. In this case, the light splitting structure can be formed by patterning at one side of the opposing substrate facing the base substrate to realize the integration of the light splitting structure and the display panel including the display units, that is, the built-in light splitting structure type 3D device structure is adopted.

Figure 13:
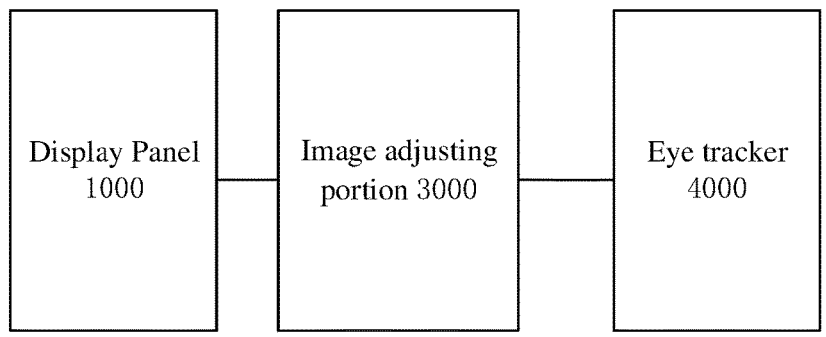
FIG. 13 is a schematic block diagram of a display device according to another example of an embodiment of the present disclosure.

FIG. 13 is a schematic block diagram of a display device according to another example of an embodiment of the present disclosure. As shown in FIG. 13, the display device includes a display panel 1000, the display panel 1000 includes the base substrate, the sub-pixels and the opposing substrate described above, and the light splitting structure is integrated with the display panel. For example, as shown in FIG. 13, the display device further includes an eye tracker 4000 and an image adjusting portion 3000, the eye tracker 4000 is connected with the image adjusting portion 3000, and the image adjusting portion 3000 is connected with the display panel 1000. The eye tracker 4000 is configured to track the position of an observer's eyeball and transmit the information of the position to the image adjusting portion 3000, and the image adjusting portion 3000 is configured to control the image displayed by the sub-pixels according to the information.

Figure 14:
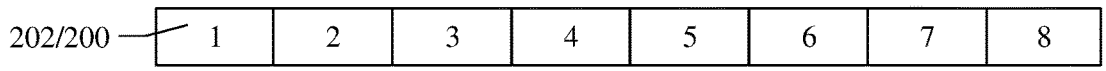
FIG. 14 is a schematic diagram of one sub-pixel including eight display units.
Figure 15:
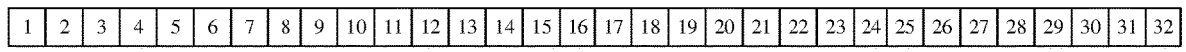
FIG. 15 is a schematic diagram of a viewpoint region formed by perform four times of time switching on the sub-pixel shown in FIG. 14.
Figure 16:
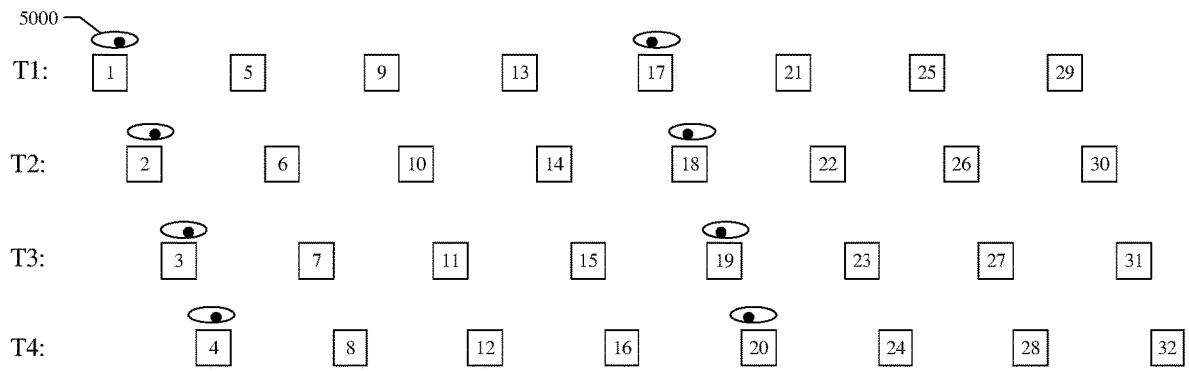
FIG. 16 is a schematic diagram of switching timing T1 to T4 according to the position of human eyes.

FIG. 14 is a schematic diagram of a sub-pixel including eight display units, FIG. 15 is a schematic diagram of a viewpoint region formed by perform four times of time switching on the sub-pixel shown in FIG. 14, and FIG. 16 is a schematic diagram of switching timing T1 to T4 according to the position of human eyes. As shown in FIGS. 13-16, the eye tracker 4000 is used to locate the position of the human eye by determining the relative coordinate position of the human eye 5000. For example, in the case where the human eye 5000 moves relative to the display device, the image which is observed by the human eye 5000 on the display device will change to some extent; and according to the position of the human eye 5000, the viewpoint image information displayed by each display unit at the time can be adjusted, that is, each display unit is multiplexed several times by timing sequence, and the display panel refreshes the viewpoint image corresponding to the position of the human eye so as to match with the position of the human eye.

For example, as shown in FIGS. 13-16, each display unit can display different viewpoint image information at different time points (e.g., time points T1 to T4), and it is equivalent to dividing one viewpoint region displayed by each display unit into a plurality of (e.g., four) different regions; the sub-region position of the human eye is determined by the eye tracker, the display units are switched to display the corresponding viewpoint image information, it is equivalent to increasing the viewpoint regions displayed by sub-pixels after passing through the light splitting portion by four times, the density of viewpoint regions is increased by four times, and the continuity of viewpoints of thin and light devices with low placement height (placement height refers to the interval between the display unit and the light splitting portion, and the interval directly affects the thickness of the display device) is realized, thus achieving the naked-eye 3D effect without jump and with smooth transition.

For example, at time point T1, the viewpoint image information displayed by sub-pixels is 1, 5, 9, 13, 17, 21, 25 and 29, respectively; at time point T2, the viewpoint image information displayed by sub-pixels is 2, 6, 10, 14, 18, 22, 26 and 30, respectively; at time point T3, the viewpoint image information displayed by sub-pixels is 3, 7, 11, 15, 19, 23, 27, and 31, respectively; and at time point T4, the viewpoint image information displayed by the sub-pixels is 4, 8, 12, 16, 20, 21, 22 and 23, respectively.

In the embodiment of the disclosure, the display panel integrated with the light splitting structure refreshes, in combination with the eye tracker, the 3D image information of the 3D visual range according to the position of the human eye; it is beneficial to realizing the naked-eye 3D display device with ultra-multi-view, non-inversion and large continuous field of view via the time sequence refresh of the 3D image content while realizing the thinning of the 3D display device. The above-mentioned "inversion" refers to a display region in which the left and right eye images are wrong and cannot be viewed normally due to the discontinuity of the viewpoint images.

For example, the display device provided by the embodiment of the present disclosure provides continuous and smooth parallax transition by increasing the viewpoint density in the visual space, restores the natural stereoscopic viewing effect as much as possible, greatly improves the viewing effect of the naked-eye 3D display device, and can be widely applied to exhibitions, advertisements, medical education, etc.

In research, the inventors of the present application have noticed that the manufacturing process capability of integrating a light splitting structure (e.g., lens) on the display unit by low temperature thermal reflow has a certain limitation on the specification of the lens. The aperture of the manufactured lens is small, and for example, usually less than 40-70 microns (it is usually difficult to cover the whole sub-pixel). In order to obtain a certain viewpoint density and enough visual space at the same time, it is often hoped that there will be enough pixels covered by the aperture of the lens; however, limited by the segmentation ability of the display units in the sub-pixel, the lens small with a small aperture contains relatively fewer pixels at present. How to increase the number of 3D viewpoints under the small aperture is particularly important for realizing the integrated and industrialized super multi-viewpoint naked-eye 3D.

With the development of the ultra-multi-view naked-eye 3D display device, reducing the aperture of the lens can greatly avoid the influence of the light splitting structure on 2D display, which is conducive to improving the application of the existing light splitting structure, can greatly reduce the cost of the naked-eye 3D display device, and is of great significance for the popularization and application of low-cost ultra-multi-viewpoint 3D products.

Figure 17:
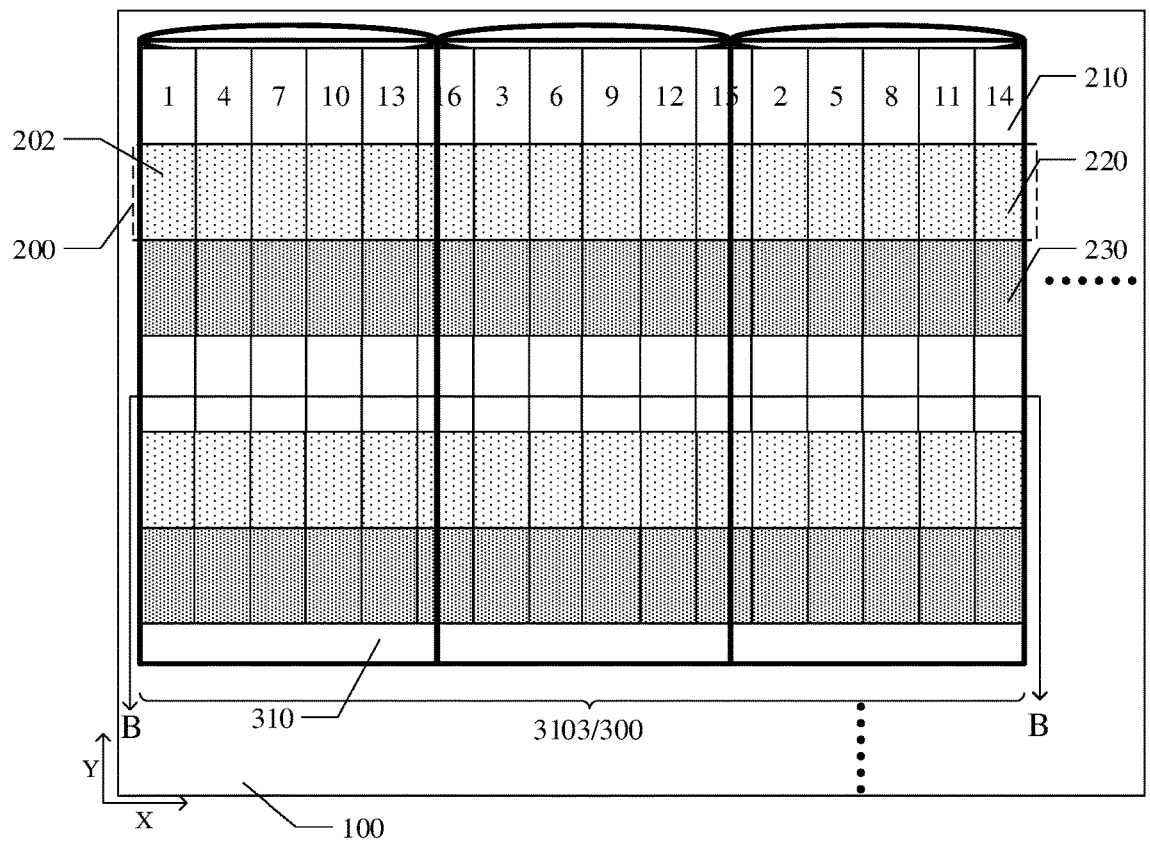
FIG. 17 is a partial plan structural view of a display device according to an example of another embodiment of the present disclosure.
Figure 18:
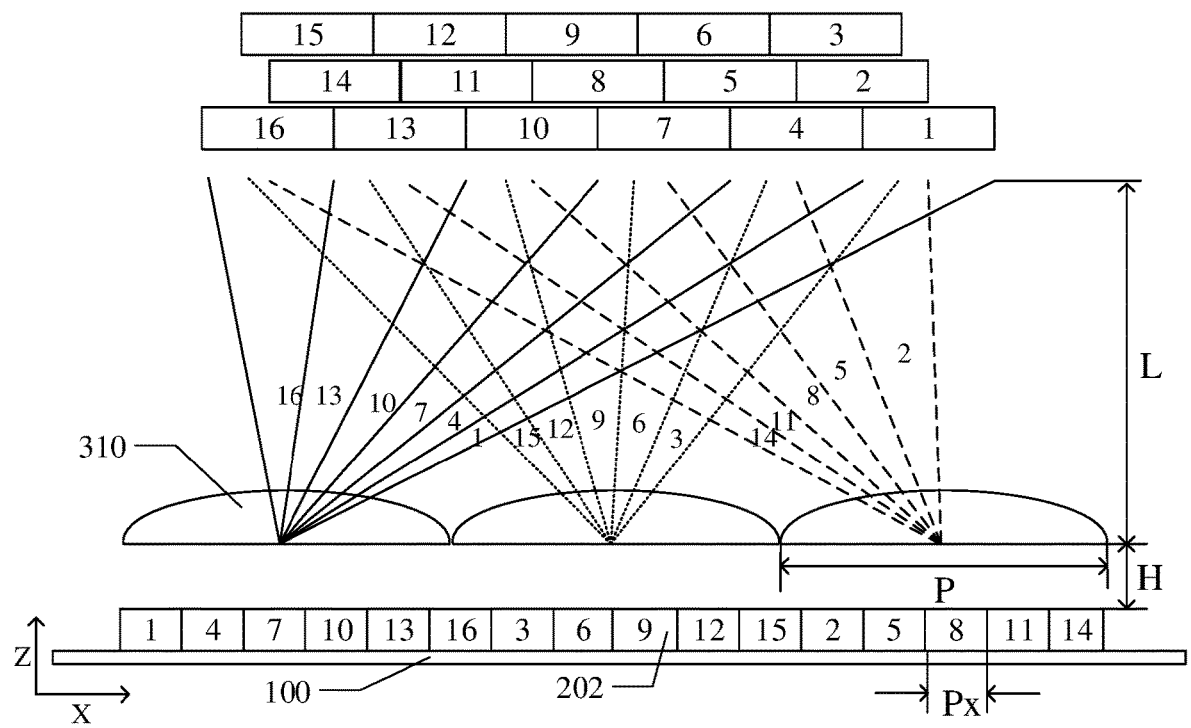
FIG. 18 is a partial cross-sectional structural view taken along line BB as shown in FIG. 17.

FIG. 17 is a partial plan structural view of a display device according to an example of another embodiment of the present disclosure, and FIG. 18 is a partial cross-sectional structural view taken along line BB as shown in FIG. 17. As shown in FIG. 17 and FIG. 18, the display device includes a base substrate 100 and a plurality of sub-pixels 200 located on the base substrate 100. The number of display units included in each sub-pixel 200 is a, and the display units 202 are arranged along the row direction. The display device further includes a light splitting structure 300 configured to split image light emitted from the plurality of sub-pixels 200 to different viewpoint regions, and the light splitting structure 300 includes a plurality of light splitting portion groups 3103 arranged along the row direction and extending along the column direction, and the orthographic projection of each light splitting portion group 3103 on the base substrate 100 is overlapped with the orthographic projection of one column of sub-pixels 200 on the base substrate 100. The number of light splitting portion group 3103 included in each is b, the light splitting portions 310 are arranged along the row direction and extending along the column direction, where a and b are positive integers, the ratio of a to b is non-integer, and b>2.

For example, the light splitting structure 300 can include a plurality of lenticular lenses, and in contrast to the resolution of the human eye, the aperture P of each lens can realize a resolution smaller than Retina at a visibility distance 1 (250 mm), so as to reduce the influence of the lenticular lenses on 2D display in the nearest viewing range. In this case, the aperture P of the lens needs to satisfy the relationship: $P \leq 1*\tan(1/60*3.1415926/180)$. The distance between the sub-pixel 200 and the light splitting portion 310 is H, the size of the display unit 202 in the X direction is Px, and the optimal viewing distance is L, so that the aperture P of the lens satisfies the relationship: $P=(a*Px*1)/[b*(1+H)]$. Therefore, in terms of a sub-pixel, it is necessary to divide a lens corresponding thereto (i.e., a light splitting portion group) into a plurality of sub-lenses (i.e., light splitting portions) to achieve a resolution smaller than Retina at the visibility distance 1.

In the embodiment of the present disclosure, by setting the ratio of the number of display units obtained by dividing a sub-pixel to the number of light splitting portions obtained by dividing a light splitting portion group as a non-integer instead of an integer, the number of viewpoints in a 3D display image region formed by a single lens can be increased.

For example, in the case where the ratio of a to b is non-integer, the viewpoints displayed by the a display units included in each sub-pixel are partially shifted, so that the sub-pixel can form a viewpoints via b light splitting portions. Assuming that the ratio of a to b is an integer, the number of viewpoints formed by each sub-pixel via b light splitting portions is only a/b, and not a.

For example, the embodiment of the present disclosure illustratively shows that the X direction is the row direction and the Y direction is the column direction, but the embodiment of the present disclosure is not limited thereto, and the row direction and the column direction can be interchanged. For example, the embodiment of the present disclosure illustratively shows that the row direction is perpendicular to the column direction, but is not limited thereto.

For example, the arrangement direction of the light splitting portions 310 is the same as the arrangement direction of the plurality of display units 202 in each sub-pixel 200, the arrangement direction can be called either the row direction or the column direction, and the embodiment of the present disclosure is described by taking that the arrangement direction is the row direction as an example.

For example, as shown in FIG. 17 and FIG. 18, the ratio of the width of each light splitting portion group 3103 in the row direction to the width of each sub-pixel 200 in the row direction is in a range from 0.9 to 1.1. For example, the width of each light splitting portion group 3103 in the row direction is the same as the width of each sub-pixel 200 in the row direction.

For example, as shown in FIG. 17 and FIG. 18, the light splitting portion 310 in the light splitting portion group 3103 includes a lenticular lens. For example, the lenticular lens includes two sides extending in the column direction, and the two sides of each lenticular lens are respectively aligned with two edges of the sub-pixel 200 opposite to each other in the row direction and extending in the column direction.

For example, FIG. 18 illustratively shows that the light splitting structure 300 is located at one side of the sub-pixels 200 away from the base substrate 100, which is not limited thereto, and the light splitting structure 300 can also be located at one side of the base substrate 100 away from the sub-pixels 200. For example, in the case where the display device provided by the embodiment of the present disclosure is a liquid crystal display device, the light splitting structure can be located at a light incident side of the sub-pixels, that is, between the backlight and the sub-pixels; and the light splitting structure can also be located at a light exit side of the image source.

For example, as shown in FIG. 17 and FIG. 18, the display device includes a plurality of first color sub-pixels 210, a plurality of second color sub-pixels 220, and a plurality of third color sub-pixels 230. For example, the first color sub-pixels 210 can be sub-pixels which emit red light (red sub-pixels), the second color sub-pixels 220 can be sub-pixels which emit green light (green sub-pixels), and the third color sub-pixels 230 can be sub-pixels which emit blue light (blue sub-pixels). The embodiment of the present disclosure is not limited thereto, and the colors of light emitted from respective color sub-pixels can be interchanged. For example, the first color sub-pixels can be sub-pixels which emit blue light, the second color sub-pixels can be sub-pixels which emit red light, and the third color sub-pixels can be sub-pixels which emit green light.

For example, as shown in FIG. 17 and FIG. 18, the sub-pixels arranged along the row direction are sub-pixels with the same color, and a first color sub-pixel row, a second color sub-pixel row and a third color sub-pixel row are arranged sequentially and repeatedly along the column direction.

For example, as shown in FIG. 17 and FIG. 18, in each sub-pixel 200, adjacent display units 202 are closely arranged. For example, adjacent display units 202 being closely arranged means that the interval between adjacent display units 202 in each sub-pixel 200 is very small (for example, the small interval only corresponds to the data line), and no black region will be presented after image light passes through the light splitting structure. Here, the "interval" in the sentence "the interval between adjacent display units 202 in each sub-pixel 200 is very small" refers to an interval between the light emitting regions of the display units, and moire is easily caused by the interval combined with the splitting structure, thus affecting the display effect of the display device.

For example, as shown in FIG. 17 and FIG. 18, adjacent light splitting portion groups 3103 are closely arranged, and adjacent light splitting portions 310 in each light splitting portion group 3103 are closely arranged. Here, "adjacent light splitting portion groups 3103 are closely arranged" (or "adjacent light splitting portions 310 are closely arranged") means that there is no interval between adjacent light splitting portion groups (or adjacent light splitting portions) or the interval is very small, as long as the image light emitted from the display units is engaged in 3D display via the light splitting portions.

For example, as shown in FIG. 17 and FIG. 18, each sub-pixel 200 includes 16 display units arranged along the row direction, that is, a is 16; each light splitting portion group 3103 includes 3 light splitting portions 310 arranged in the row direction and extending in the column direction, that is, b is 3, and the ratio of a to b is a non-integer number. The embodiment of the present disclosure is not limited thereto, and the number of light splitting portions can also be 5 or 7. The number of display units and the number of light splitting portions can be set according to the standard that the display device can meet the resolution less than Retina at the visibility distance.

For example, in FIG. 17 and FIG. 18, the 16 display units included in one sub-pixel are illustratively numbered 1-16, and the 16 viewpoint regions formed by the 16 display units via the light splitting portion group are also correspondingly numbered 1-16. The viewpoint regions formed after image light emitted from each display unit 202 passes through three light splitting portions 310 are shown in FIG. 18. Six viewpoint regions 1, 4, 7, 10, 13 and 16 are formed after the image light emitted from the display units 1, 4, 7, 10, 13 and 16 passes through the first light splitting portion; five viewpoint regions 3, 6, 9, 12 and 15 are formed after the image light emitted from the display units 3, 6, 9, 12 and 15 passes through the second light splitting portion; and five viewpoint regions 2, 5, 8, 11 and 14 are formed after the image light emitted from the display units 2, 5, 8, 11 and 14 passes through the third light splitting portion. Three groups of viewpoint regions formed by one sub-pixel via the plurality of light splitting portions of each light splitting portion group are located in different rows, but when viewed by human eyes, they are overlapped into one row of viewpoint regions; and viewpoint region 1 is overlapped with a part of viewpoint region 2 and a part of viewpoint region 3, viewpoint region 4 is overlapped with a part of viewpoint region 5 and a part of viewpoint region 6, viewpoint region 7 is overlapped with a part of viewpoint region 8 and a part of viewpoint region 9, viewpoint region 10 is overlapped with a part of viewpoint region 11 and a part of viewpoint region 12, viewpoint region 13 is overlapped with a part of viewpoint region 14 and a part of viewpoint region 15, and viewpoint region 16 is overlapped with the other part of viewpoint region 14 and the other part of viewpoint region 15.

Figure 19:
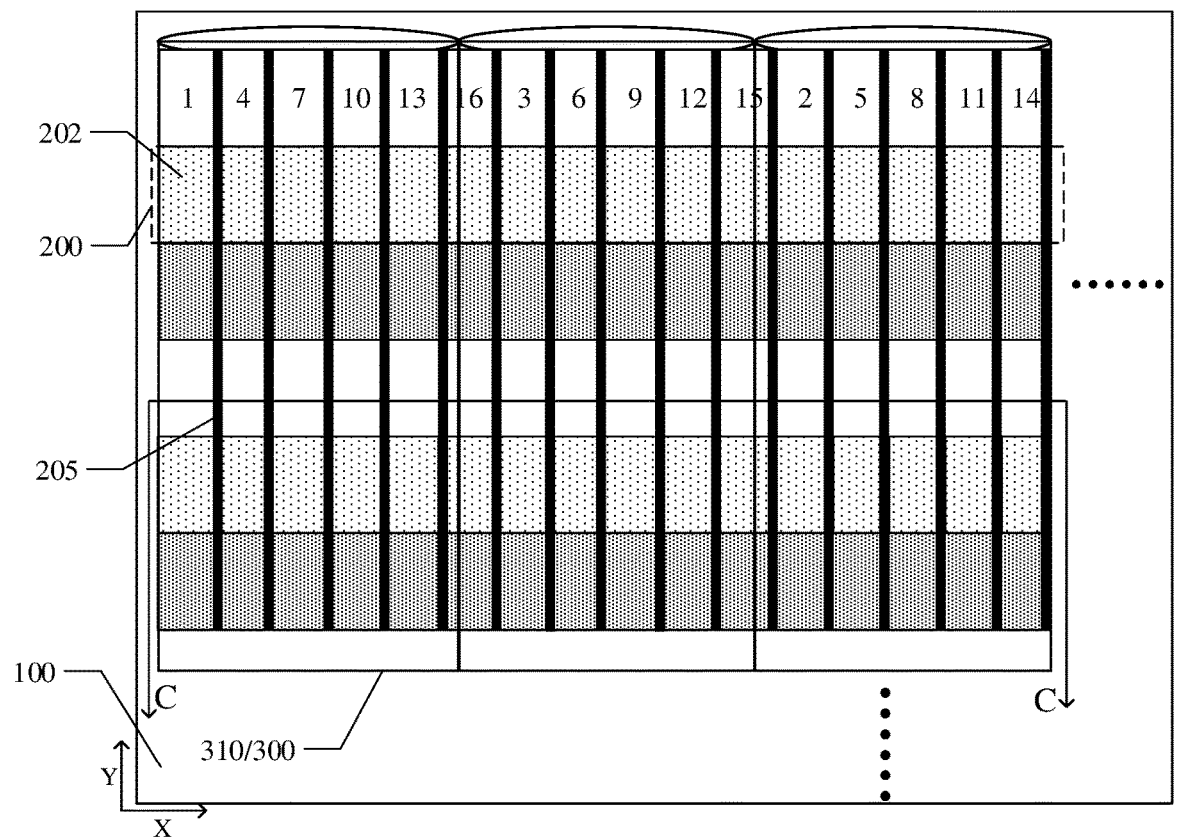
FIG. 19 is a partial plan structural view of a display device according to another example of another embodiment of the present disclosure.
Figure 20:
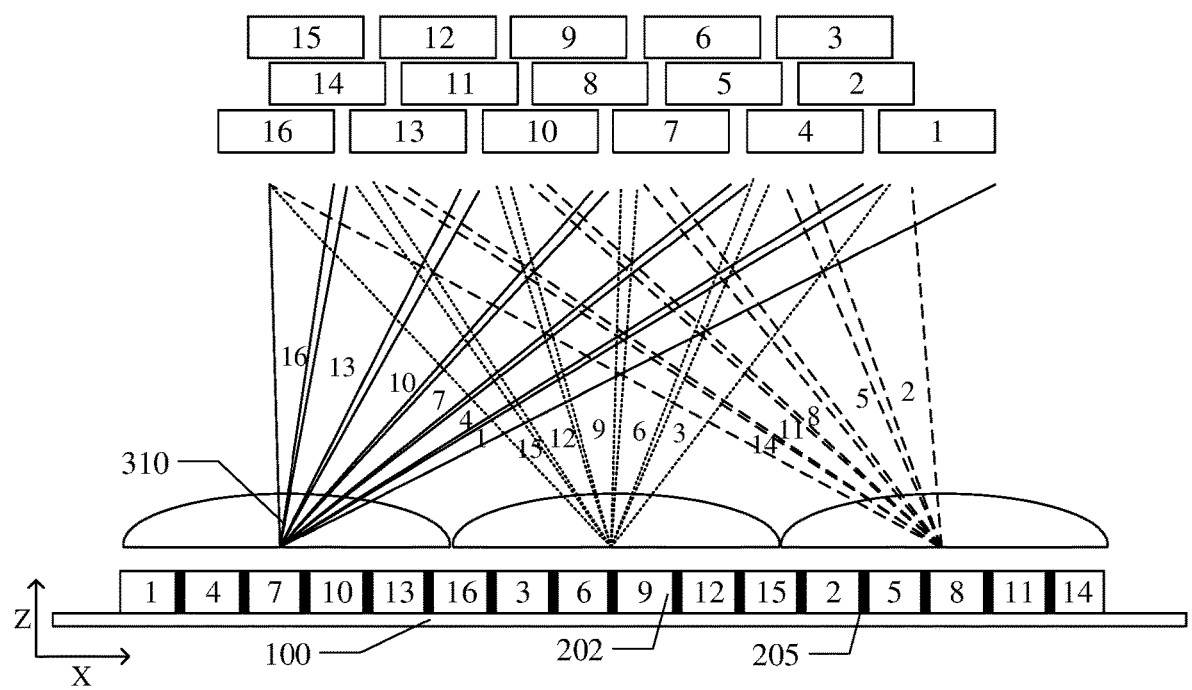
FIG. 20 is a partial cross-sectional structural view taken along line CC as shown in FIG. 19.

For example, FIG. 19 is a partial plan structural view of a display device according to another example of another embodiment of the present disclosure, and FIG. 20 is a partial cross-sectional structural view taken along line CC as shown in FIG. 19. As shown in FIG. 19 and FIG. 20, the present example is different from the example shown in FIG. 17 in that there is an interval 205 between two adjacent display units 202 in each sub-pixel 200, and along the row direction, the ratio of the size of each display unit 202 to the size of each interval 205 is c, where c=b−1.

In the embodiment of the present disclosure, the interval between adjacent display units 202 described above means that there is a relatively large interval between the light emitting regions of adjacent display units 202, and the interval between the light emitting regions cause image light to easily form the moire after passing through the light splitting device, thus affecting the display effect of the display device.

The embodiment of the present disclosure, by limiting the ratio between the size of the light emitting region of each display unit and the size of the interval, as well as the number of the light splitting portions in each light splitting portion group, the peak crosstalk of the overlapping viewpoint regions can be guaranteed to be 0 as much as possible, and the splicing compensation at the interval can be realized through the shifted arrangement of the light splitting portions relative to the display units, thereby avoiding the occurrence of the moire.

For example, as shown in FIG. 19 and FIG. 20, each sub-pixel 200 includes 16 display units arranged along the row direction, that is, a is 16; each light splitting portion group 3103 includes 3 light splitting portions 310 arranged in the row direction and extending in the column direction, that is, b is 3, and the ratio c of the size of the light emitting region of each display unit 202 to the size of each interval 205 is 2.

For example, in FIG. 19 and FIG. 20, the 16 display units included in one sub-pixel are illustratively numbered 1-16, and the 16 viewpoint regions formed by the 16 display units via the light splitting portion group are also correspondingly numbered 1-16.

For example, viewpoint region 2 formed by the third light splitting portion 310 is overlapped, by 50%, with viewpoint region 1 formed by the first light splitting portion 310, and the peak value of viewpoint region 2 is not overlapped with the peak value of viewpoint region 1, so that the crosstalk can be zero; and at the same time, viewpoint region 2 and viewpoint region 3, through the misalignment with respect to the light splitting portion 310, perform splicing compensation for the black region formed at one side of viewpoint region 1 and corresponding to the gap, thus achieving the effect of avoiding moire.

For example, in the embodiment of the present disclosure, the light splitting structure is integrated with the display panel including sub-pixels. Because there is no need to separately align and attach the light splitting structure and the display panel, on the one hand, the process compatibility between the light splitting structure and the display panel is realized, and on the other hand, the panel cell-assembling process is adopted to realize the alignment between the sub-pixels and the light splitting portions, which solves the problem of alignment difficulty in the split naked-eye 3D display device, is beneficial to improving the alignment accuracy of the 3D display device, and is beneficial to the thinning and low-cost production of the 3D display device.

For example, the display device in the embodiment of the present disclosure can further include an eye tracker and an image adjusting portion as shown in FIG. 13, the eye tracker is connected with the image adjusting portion, and the image adjusting portion is connected with the display panel. The eye tracker is configured to track the position of an observer's eyeball and transmit the information of the position to the image adjusting portion, and the image adjusting portion is configured to control the image displayed by the sub-pixels according to the information. According to the position of the human eye, the display device can adjust the viewpoint image information displayed by each display unit at the time point, that is, each display unit is multiplexed several times by timing sequence, for example, q times (it is equivalent to increasing the viewpoint regions displayed by sub-pixels after passing through the light splitting portion by q times, the density of viewpoint regions is increased by q times); and the display panel refreshes the viewpoint image corresponding to the position of the human eye so as to match with the position of the human eye, thus realizing the continuity of viewpoints of thin and light devices with low placement height and achieving the naked-eye 3D effect without jump and with smooth transition.

The following statements should be noted:

(1) The accompanying drawings related to the embodiment(s) of the present disclosure involve only the structure(s) in connection with the embodiment(s) of the present disclosure, and other structure(s) can be referred to common design(s).

(2) In case of no conflict, features in one embodiment or in different embodiments of the present disclosure can be combined.

What have been described above are only specific implementations of the present disclosure, and the protection scope of the present disclosure is not limited thereto. Therefore, the protection scope of the present disclosure should be determined based on the protection scope of the appended claims.

What is claimed is:

1. A display device, comprising:
a base substrate;
a plurality of sub-pixels, located on the base substrate; and
a light splitting structure, configured to split image light emitted from the plurality of sub-pixels to different viewpoint regions, the light splitting structure comprising a plurality of light splitting portions arranged along a row direction and extending along a column direction,
wherein each of the plurality of sub-pixels comprises a plurality of display units arranged along the row direction, the plurality of sub-pixels are arranged as a plurality of sub-pixel row groups, the plurality of sub-pixel row groups extend along the row direction and are arranged along the column direction, each of the plurality of sub-pixel row groups comprises at least two rows of sub-pixels, a gap is provided between two adjacent sub-pixels in each row of sub-pixels, and two adjacent rows of sub-pixels in each of the plurality of sub-pixel row groups are shifted from each other in the row direction so that a sub-pixel in one row of sub-pixels and the gap between two adjacent sub-pixels in another row of sub-pixels are shifted from each other, and
a ratio of a size of each of the plurality of light splitting portions along the row direction to a pitch of the plurality of sub-pixels is in a range from 0.9 to 1.1,
wherein each of the plurality of sub-pixel row groups comprises a plurality of first color sub-pixels, a plurality of second color sub-pixels, and a plurality of third color sub-pixels, and a plurality of viewpoint regions formed after image light emitted from each of the plurality of sub-pixel row groups passing through the light splitting structure are continuously arranged along the row direction,
wherein the light splitting structure comprises a plurality of light splitting portion column groups, each of the plurality of light splitting portion column groups comprises at least two light splitting portions, and sub-pixels with a same color corresponding to a same light splitting portion column group and located in a same sub-pixel row group respectively correspond to different regions in different light splitting portions, and
for sub-pixels corresponding to a same light splitting portion column group and located in a same sub-pixel row group, one gap, which is located in the same row as and adjacent to each color sub-pixel corresponding to one light splitting portion, corresponds to a region relative to the one light splitting portion, the same region relative to another light splitting portion is overlapped in the column direction with a sub-pixel with the same color as the each color sub-pixel and corresponding to the another light splitting portion.

2. The display device according to claim 1, wherein, for sub-pixels with a same color corresponding to a same light splitting portion and located in a same sub-pixel row group, one gap located in the same row as and adjacent to a sub-pixel is overlapped in the column direction with a sub-pixel with the same color from a different row.

3. The display device according to claim 2, wherein sub-pixels arranged along the row direction are sub-pixels with a same color, and a first color sub-pixel row, a second color sub-pixel row, and a third color sub-pixel row are arranged sequentially and repeatedly along the column direction, and each of the plurality of sub-pixel row groups comprises 3N rows of sub-pixels, where N is a positive integer.

4. The display device according to claim 3, wherein, in each of the plurality of sub-pixel row groups, one gap located in the same row as and adjacent to each color sub-pixel is overlapped, in the column direction, with a sub-pixel located in a different row and of a color different from that of the each color sub-pixel.

5. The display device according to claim 3, wherein each of the plurality of sub-pixel row groups comprises M rows of sub-pixels, and a shifted direction of a (m+1)-th row of sub-pixels relative to an m-th row of sub-pixels is the same as a shifted direction of a (m+2)-th row of sub-pixels relative to the (m+1)-th row of sub-pixels, where M≥3, M≥ (m+2), and m is a positive integer.

6. The display device according to claim 2, wherein the plurality of first color sub-pixels, the plurality of second color sub-pixels, and the plurality of third color sub-pixels are arranged sequentially and repeatedly along the row direction, sub-pixels located in different rows and with a same color are overlapped in the column direction, sub-pixels located in different rows and of different colors are not overlapped in the column direction, in two adjacent rows of sub-pixels which are respectively located in adjacent sub-pixel row groups, a right edge of one row of sub-pixels is aligned with a left edge of the other row of sub-pixels of a color different from that of the one row of sub-pixels, and each of the plurality of sub-pixels comprises the left edge and the right edge which are opposite to each other in the row direction and extend in the column direction.

7. The display device according to claim 1, wherein the plurality of first color sub-pixels, the plurality of second color sub-pixels, and the plurality of third color sub-pixels are arranged sequentially and repeatedly along the row direction, and in each of the plurality of sub-pixel row groups, one gap located in the same row as and adjacent to each color sub-pixel is overlapped, in the column direction, with a sub-pixel located in a different row and of a color different from that of the sub-pixel adjacent to the gap.

8. The display device according to claim 1, wherein adjacent display units are closely arranged in each of the plurality of sub-pixels.

9. The display device according to claim 1, wherein each of the plurality of light splitting portions comprises a lenticular lens.

10. The display device according to claim 1, further comprising: an eye tracker and an image adjusting portion, the eye tracker being connected with the image adjusting portion, the image adjusting portion being connected with a display panel, and the display panel comprising the base substrate and the plurality of sub-pixels, wherein the eye tracker is configured to track a position of an eye and transmit information of the position to the image adjusting portion, and the image adjusting portion is configured to control corresponding viewpoint image information displayed by the plurality of sub-pixels according to the information.

* * * * *